US009557531B2

(12) United States Patent
Nishihata et al.

(10) Patent No.: US 9,557,531 B2
(45) Date of Patent: *Jan. 31, 2017

(54) IMAGING LENS AND IMAGING APPARATUS EQUIPPED WITH THE IMAGING LENS

(71) Applicant: FUJIFILM Corporation, Tokyo (JP)

(72) Inventors: Sumihiro Nishihata, Saitama-ken (JP); Motoari Ota, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 29 days.

This patent is subject to a terminal disclaimer.

(21) Appl. No.: 14/565,893

(22) Filed: Dec. 10, 2014

(65) Prior Publication Data
US 2015/0168686 A1    Jun. 18, 2015

(30) Foreign Application Priority Data

Dec. 13, 2013   (JP) .................................. 2013-257732

(51) Int. Cl.
G02B 13/00    (2006.01)
G02B 9/62     (2006.01)
G02B 13/04    (2006.01)

(52) U.S. Cl.
CPC ............. *G02B 13/0045* (2013.01); *G02B 9/62* (2013.01); *G02B 13/04* (2013.01)

(58) Field of Classification Search
CPC ....... G02B 13/0045; G02B 9/62; G02B 13/18; H04N 5/225

USPC ................ 359/713–714, 756–757, 763–764
See application file for complete search history.

(56) References Cited

U.S. PATENT DOCUMENTS

| 4,668,054 | A  | * | 5/1987 | Takase | ................... | G02B 15/04 |
|---|---|---|---|---|---|---|
|  |  |  |  |  |  | 359/674 |
| 2014/0111876 | A1 |  | 4/2014 | Tang et al. |  |  |
| 2014/0320981 | A1 | * | 10/2014 | Hsieh | ................. | G02B 13/0045 |
|  |  |  |  |  |  | 359/713 |
| 2015/0070783 | A1 | * | 3/2015 | Hashimoto | ........ | G02B 13/0045 |
|  |  |  |  |  |  | 359/708 |
| 2015/0260953 | A1 | * | 9/2015 | Ota | .................... | G02B 13/0045 |
|  |  |  |  |  |  | 359/738 |
| 2015/0362702 | A1 | * | 12/2015 | Tang | .................. | G02B 13/0045 |
|  |  |  |  |  |  | 348/335 |
| 2016/0116715 | A1 | * | 4/2016 | Ota | .................... | G02B 13/0045 |
|  |  |  |  |  |  | 359/757 |

FOREIGN PATENT DOCUMENTS

| KR |  | 2010-0040357 | 4/2010 |
|---|---|---|---|
| TW |  | 201305595 | 2/2013 |

* cited by examiner

*Primary Examiner* — Jordan Schwartz
(74) *Attorney, Agent, or Firm* — Young & Thompson

(57) ABSTRACT

An imaging lens, substantially consisting of six lenses, composed of a first lens having a positive refractive power and a meniscus shape with a convex surface on the object side, a second lens having a negative refractive power, a third lens having a positive refractive power, a fourth lens having a positive refractive power, a fifth lens having a negative refractive power and a biconcave shape, and a sixth lens having a negative refractive power, disposed in order from the object side.

20 Claims, 12 Drawing Sheets

IMAGING LENS AND IMAGING APPARATUS EQUIPPED WITH THE IMAGING LENS

CROSS-REFERENCE TO RELATED APPLICATIONS

The present application claims priority under 35 U.S.C. §119 to Japanese Patent Application No. 2013-257732 filed on Dec. 13, 2013. The above application is hereby expressly incorporated by reference, in its entirety, into the present application.

BACKGROUND OF THE INVENTION

Field of the Invention

The present invention relates to a fixed-focus imaging lens that forms an optical image of a subject on an image sensor, such as, for example, a CCD (Charge Coupled Device) or a CMOS (Complementary Metal Oxide Semiconductor), and an imaging device equipped with the imaging lens and performs imaging, such as a digital still camera, a camera equipped portable phone, a personal digital assistance (PDA), a smartphone, a tablet terminal, a portable game machine, or the like.

Description of the Related Art

Along with a widespread use of personal computers in homes, digital still cameras that can input image information, such as imaged landscapes and portraits, in personal computers are spreading rapidly. In addition, more and more portable phones, smartphones, and tablet terminals are equipped with camera modules for image input. Such devices having imaging capabilities use image sensors, such as CCDs, CMOSs, and the like. Recently, as downsizing of these image sensors have advanced, imaging devices as a whole and imaging lenses equipped therein are also demanded to be downsized. At the same time, higher pixel count of image sensors is also in progress, and high resolution and high performance are demanded for imaging lenses. For example, a performance compatible with 5 mega pixels or greater, more preferably, 8 mega pixels or greater is demanded.

In order to meet such demands, an imaging lens composed of a relatively large number of lenses, i.e., five lenses, is proposed, and recently an imaging lens composed of six lenses has also been proposed. For example, Taiwanese Patent Publication No. 201305595 and Korean Patent Publication No. 2010-0040357 propose six-element imaging lenses, composed of a first lens having a positive power, a second lens having a negative power, a third lens having a positive power, a fourth lens having a positive power, a fifth lens having a negative power, and a sixth lens having a negative power are disposed from the object side.

SUMMARY OF THE INVENTION

In the meantime, for imaging lenses used, in particular, for the devices which tend to thinning, such as smartphones and tablet terminals, reduction in overall lens length and increase in angle of view are demanded while being compatible with higher pixel count of image sensors. But, the imaging lens described in Taiwanese Patent Publication No. 201305595 is required further reduction in overall lens length while the imaging lens described in Korean Patent Publication No. 2010-0040357 is required further increase in angle of view.

The present invention has been developed in view of the aforementioned points, and it is an object of the present invention to provide an imaging lens reduced in overall lens length and increased in angle of view, while being compatible with higher pixel count of image sensors, and an imaging apparatus equipped with the imaging lens and capable of capturing high resolution images.

An imaging lens of the present invention substantially consists of six lenses, composed of a first lens having a positive refractive power and a meniscus shape with a convex surface on the object side, a second lens having a negative refractive power, a third lens having a positive refractive power, a fourth lens having a positive refractive power, a fifth lens having a negative refractive power and a biconcave shape, and a sixth lens having a negative refractive power disposed in order from the object side. In the imaging lens of the present invention, employment of the following preferable configurations may further improve the optical performance.

In the imaging lens of the present invention, the fourth lens preferably has a meniscus shape with a concave surface on the object side.

In the imaging lens of the present invention, the sixth lens preferably has a meniscus shape with a concave surface on the image side.

In the imaging lens of the present invention, the second lens preferably has a biconcave shape.

In the imaging lens of the present invention, the third lens preferably has a convex surface on the object side.

In the imaging lens of the present invention, a stop is preferably disposed on the object side of the object side surface of the second lens.

Preferably, the imaging lens of the present invention satisfies any one or any combination of conditional expressions (1) to (7), (1-1) to (5-1), and (7-1) given below.

$$0.7 < f/f1 < 5 \quad (1)$$

$$0.8 < f/f1 < 3 \quad (1\text{-}1)$$

$$0 < f/f3 < 1.5 \quad (2)$$

$$0.3 < f/f3 < 1.2 \quad (2\text{-}1)$$

$$-2.4 < f \cdot P34 < -1 \quad (3)$$

$$-1.9 < f \cdot P34 < -1.1 \quad (3\text{-}1)$$

$$-5.3 < (L4r+L4f)/(L4r-L4f) < -3 \quad (4)$$

$$-4.6 < (L4r+L4f)/(L4r-L4f) < -3.65 \quad (4\text{-}1)$$

$$-2.6 < (L5r+L5f)/(L5r-L5f) < 3.8 \quad (5)$$

$$-1.4 < (L5r+L5f)/(L5r-L5f) < 2.3 \quad (5\text{-}1)$$

$$-0.67 < f4/f5 < -0.35 \quad (6)$$

$$0.5 < f \cdot \tan \omega / L6r < 20 \quad (7)$$

$$1 < f \cdot \tan \omega / L6r < 5 \quad (7\text{-}1)$$

where:
  f: focal length of the entire system
  f1: focal length of the first lens
  f3: focal length of the third lens
  f4: focal length of the fourth lens
  f5: focal length of the fifth lens
  L4f: paraxial radius of curvature of the object side surface of the fourth lens
  L4r: paraxial radius of curvature of the image side surface of the fourth lens L5f: paraxial radius of curvature of the object side surface of the fifth lens L5r: paraxial radius of curvature of the image side surface of the fifth lens L6r: paraxial radius of curvature of the image side surface of the sixth lens ω: half angle of view P34: refractive power of air lens formed by the image side surface of the third lens and the object side surface of the fourth lens, and can be obtained by a formula (P) given below.

$$P34 = \frac{1 - Nd3}{L3r} + \frac{Nd4 - 1}{L4f} - \frac{(1 - Nd3) \times (Nd4 - 1) \times D7}{L3r \times L4f} \quad (P)$$

where:
Nd3: refractive index of the third lens with respect to the d-line

Nd4: refractive index of the fourth lens with respect to the d-line

L3r: paraxial radius of curvature of the image side surface of the third lens

L4f: paraxial radius of curvature of the object side surface of the fourth lens

D7: air distance on the optical axis between the third lens and the fourth lens.

In the imaging lens of the present invention, the term "substantially consists of six lenses" refers to include the case in which that the imaging lens of the present invention includes a lens having substantially no refractive power, an optical element other than a lens, such as a stop, a cover glass, and the like, a lens flange, a lens barrel, and a mechanical component, for example, a camera shake correction mechanism, in addition to the six lenses.

The surface shapes and the signs of refractive powers of the aforementioned lenses are considered in the paraxial region if they include aspherical surfaces. The sign of a radius of curvature is positive for a surface shape with a convex surface on the object side and negative for a surface shape with a convex surface on the image side.

An imaging apparatus of the present invention is equipped with the imaging lens of the present invention, According to the imaging lens of the present invention, each lens element is optimally formed in a six-element configuration as a whole and, in particular, the shapes of the first lens and the fifth lenses are formed preferably. This allows realization of a lens system reduced in the overall lens length and increased in angle of view, while being compatible with higher pixel count of image sensors.

Further, according to the imaging apparatus of the present invention, the size of the apparatus in an optical axis direction of the imaging lens may be reduced, and a wide angle and a high resolution image may be obtained by imaging, as the apparatus is equipped with the imaging lens of the present invention.

DESCRIPTION OF THE PREFERRED EMBODIMENTS

Hereinafter, embodiments of the present invention will be described in detail with reference to the accompanying drawings.

Figure 1:
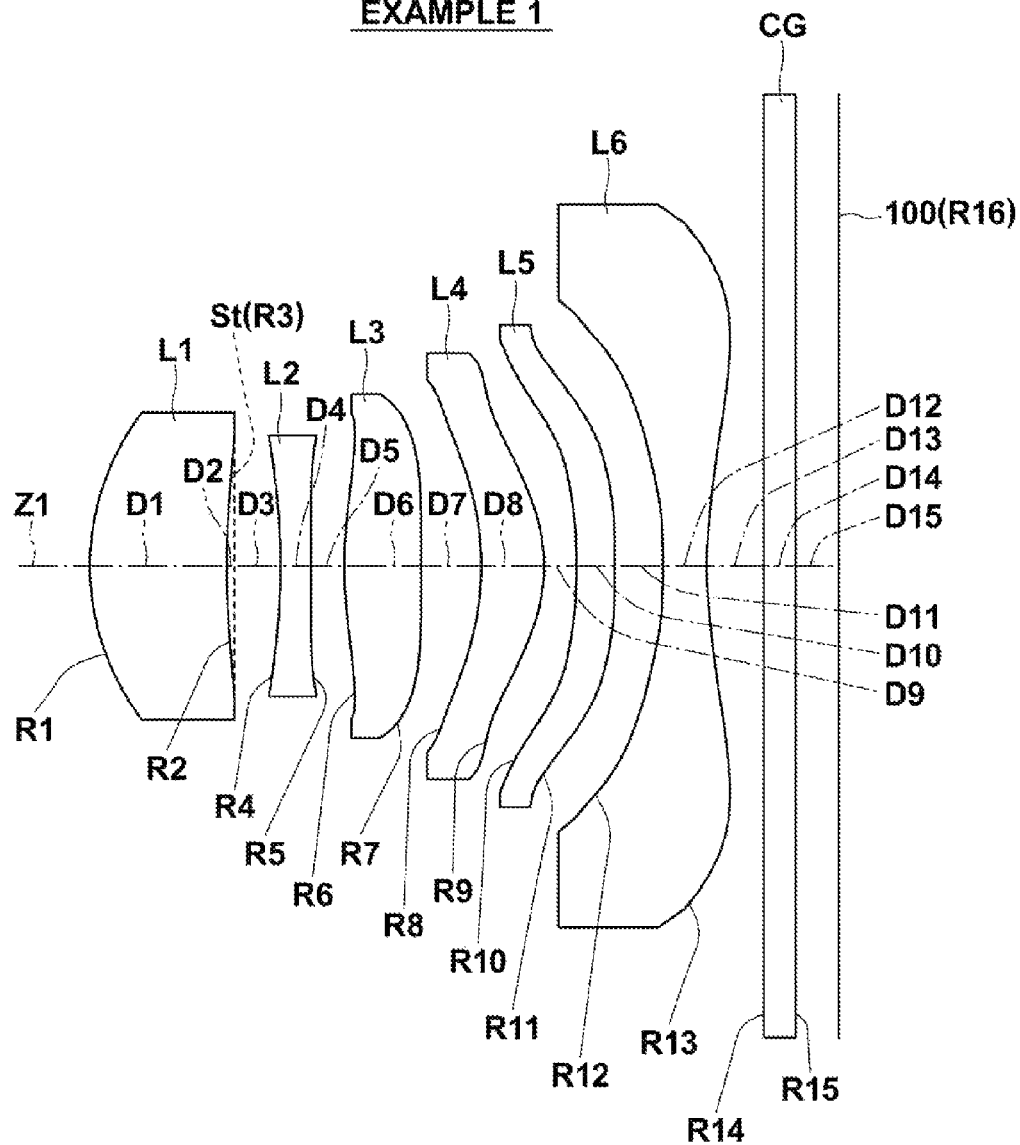
FIG. 1 is a cross-sectional view of an imaging lens according to one embodiment of the present invention, illustrating a first configuration example which corresponds to Example 1.
Figure 2:
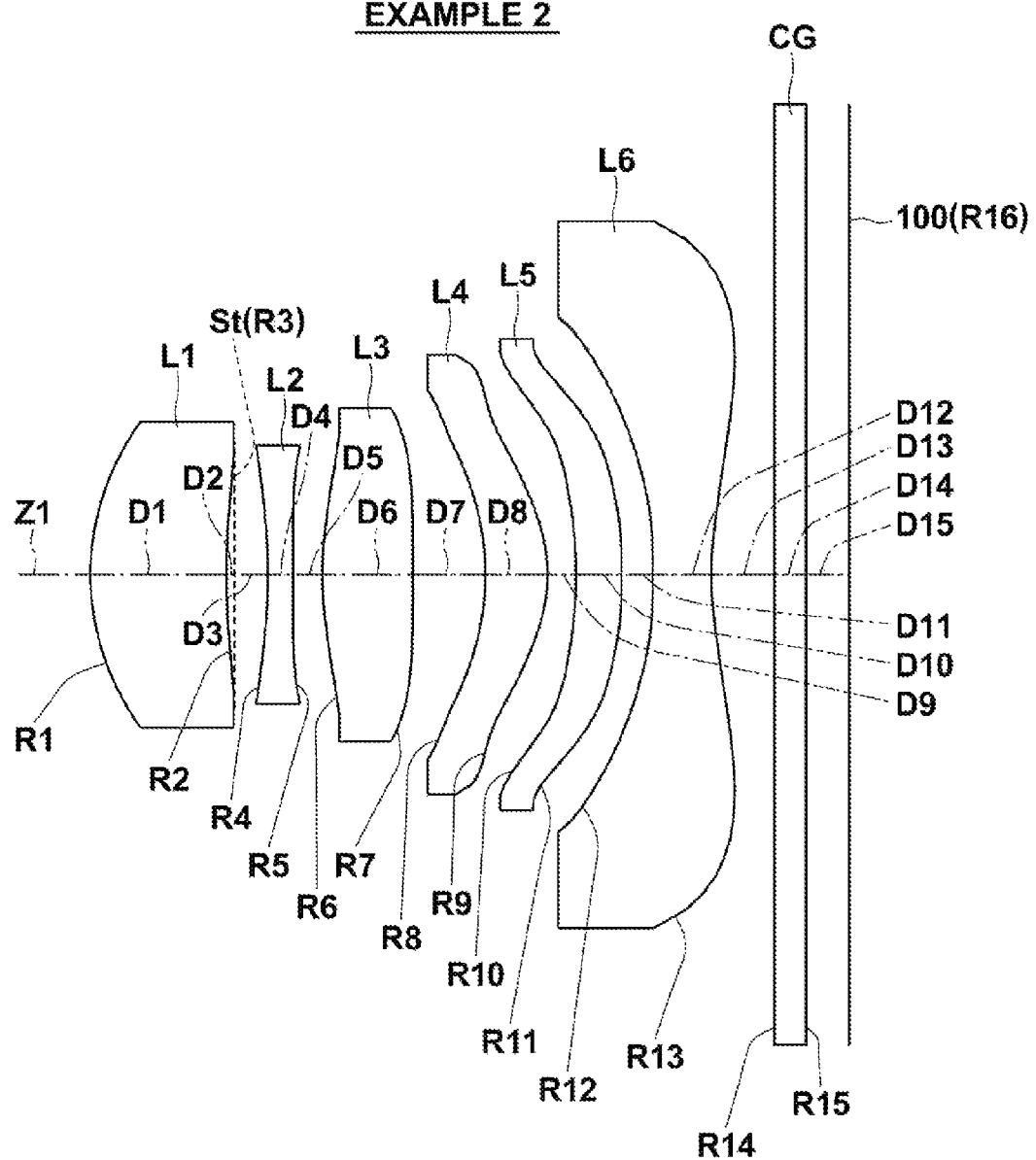
FIG. 2 is a cross-sectional view of an imaging lens according to one embodiment of the present invention, illustrating a second configuration example which corresponds to Example 2.
Figure 3:
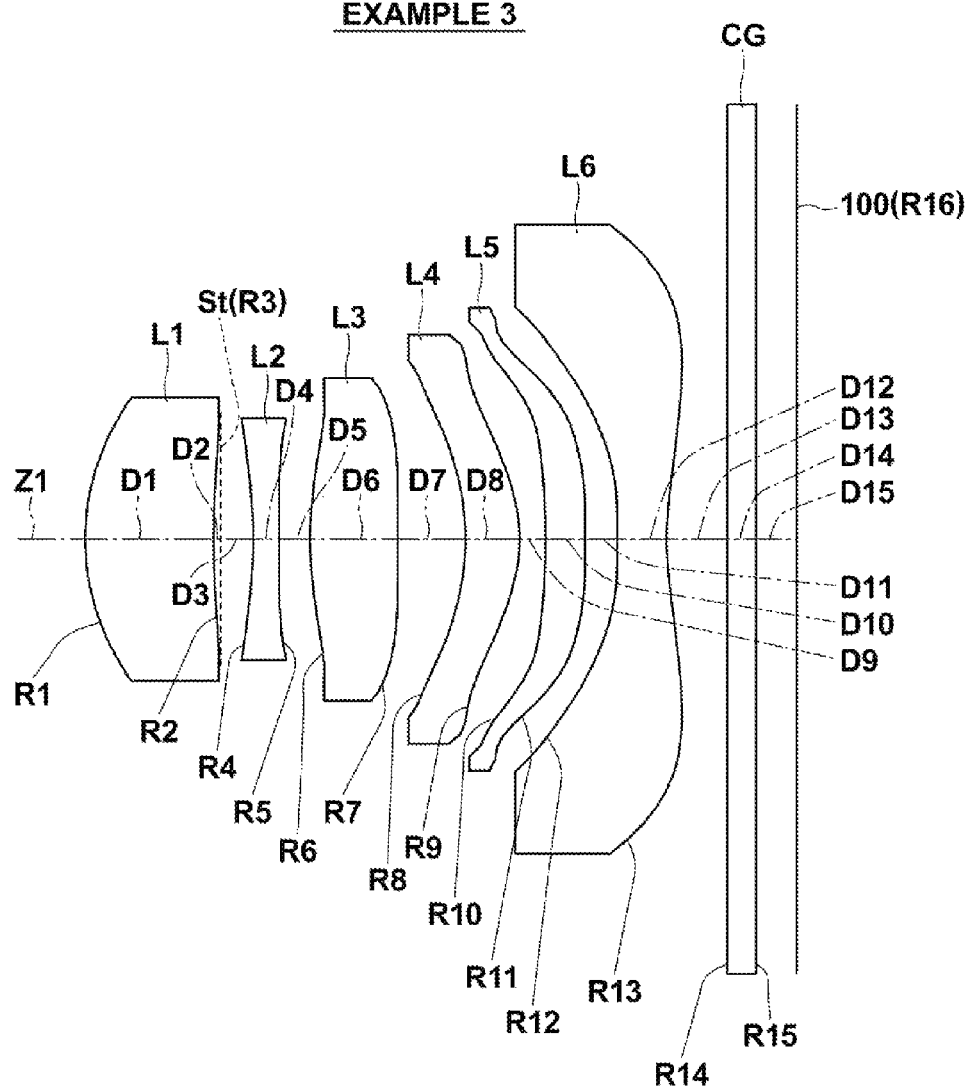
FIG. 3 is a cross-sectional view of an imaging lens according to one embodiment of the present invention, illustrating a third configuration example which corresponds to Example 3.
Figure 4:
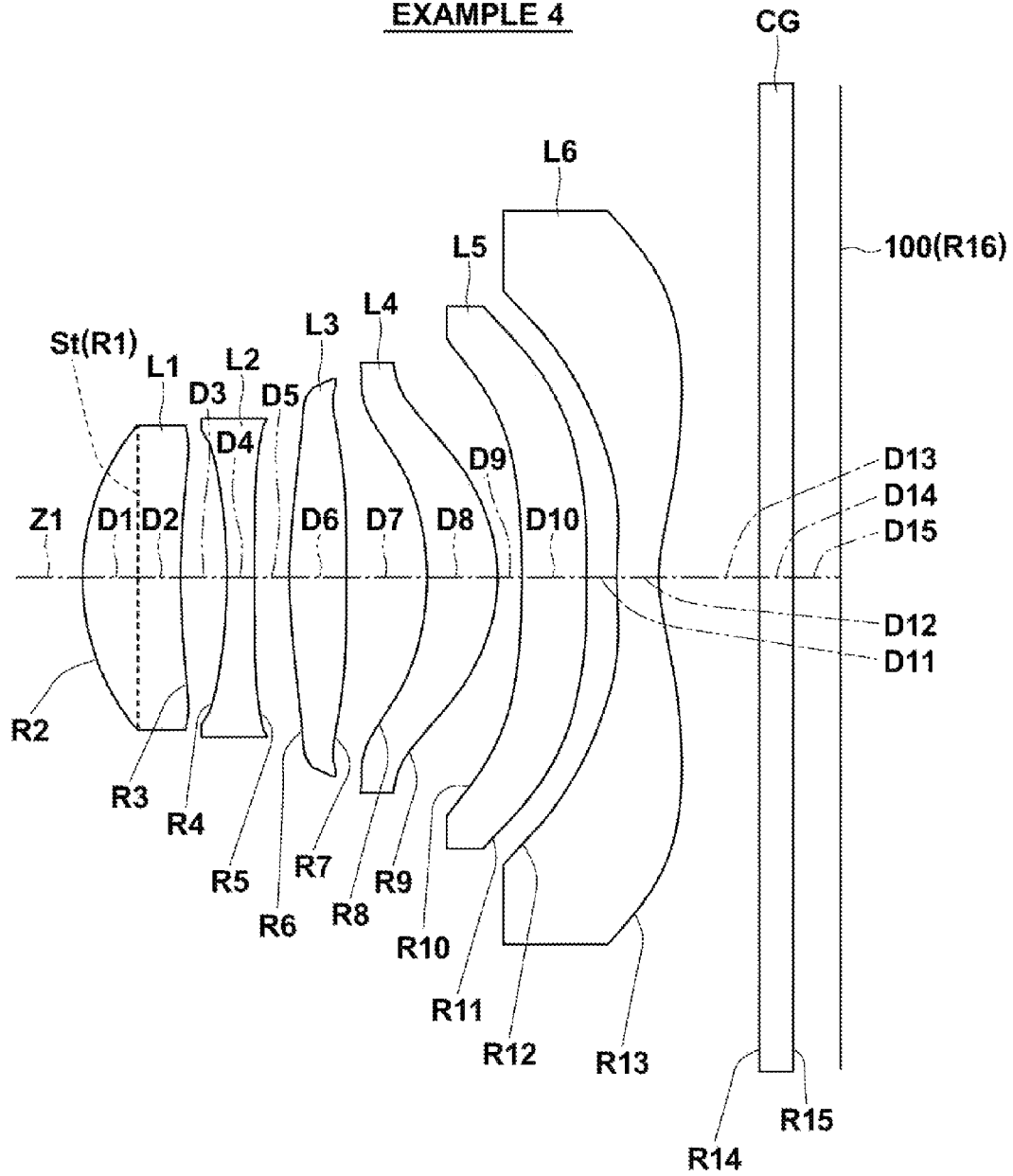
FIG. 4 is a cross-sectional view of an imaging lens according to one embodiment of the present invention, illustrating a fourth configuration example which corresponds to Example 4.
Figure 5:
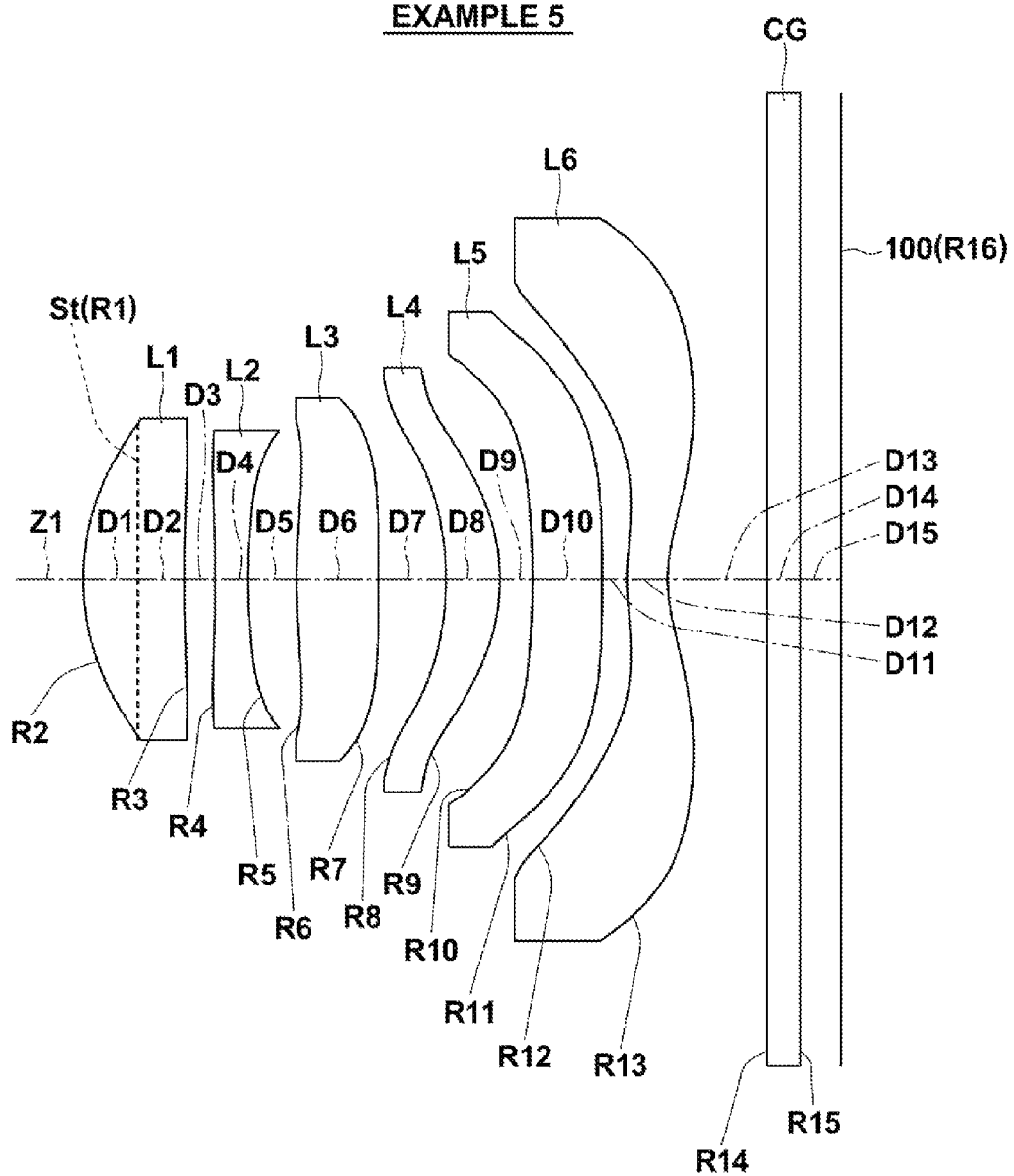
FIG. 5 is a cross-sectional view of an imaging lens according to one embodiment of the present invention, illustrating a fifth configuration example which corresponds to Example 5.
Figure 6:
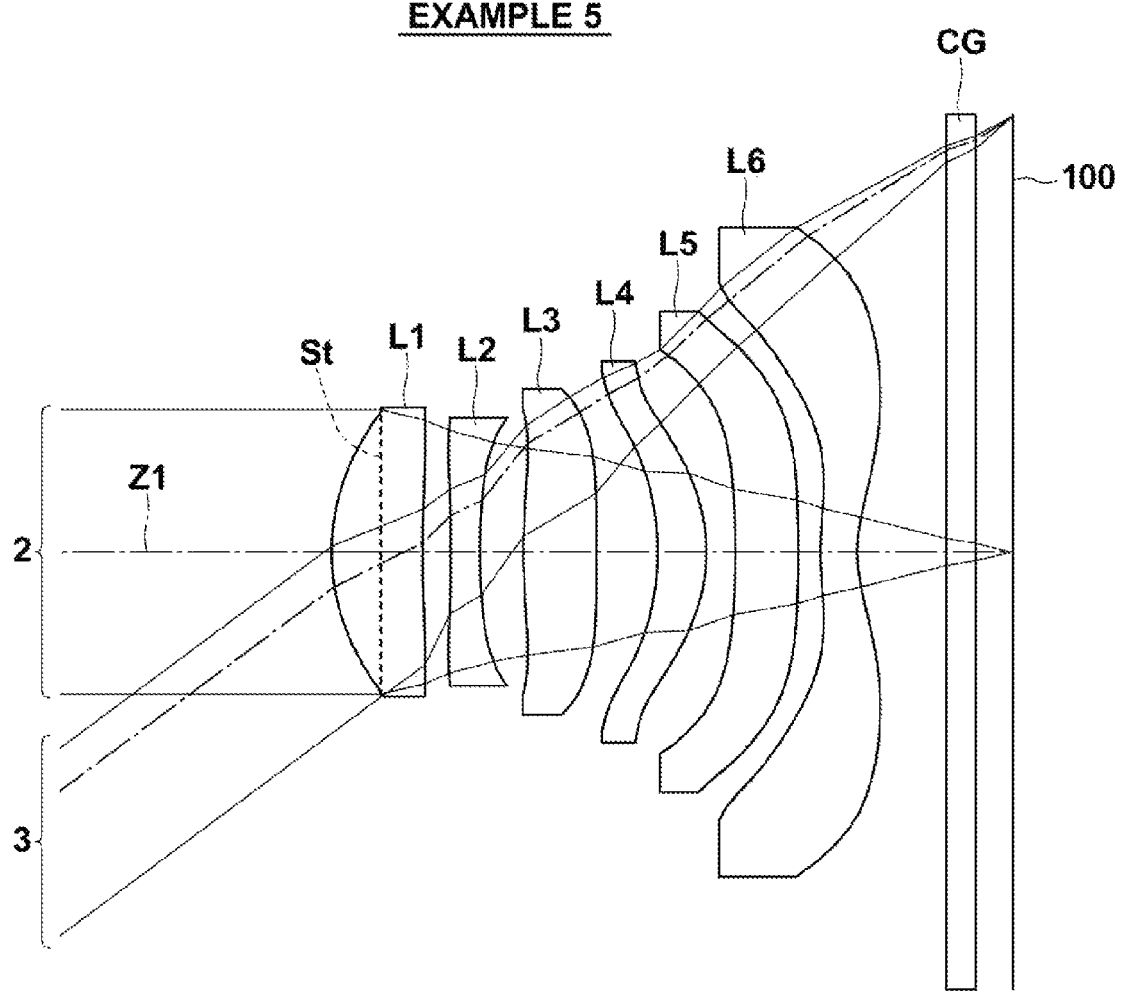
FIG. 6 is a ray diagram of the imaging lens illustrated in FIG. 5.

FIG. 1 illustrates a first configuration example of an imaging lens according to a first embodiment. This configuration example corresponds to the lens configuration of a first numerical example (Tables 1 and 2) to be described later. Likewise, second to fifth cross-sectional configuration examples corresponding to numerical examples (Tables 3 to 10) according to the second to the fifth embodiments, to be described later, are shown in FIGS. 2 to 5 respectively. In FIGS. 1 to 5, the symbol Ri indicates a radius of curvature of $i^{th}$ surface in which a number i (i=1, 2, 3, - - - ) is given to each surface in a serially increasing manner toward the image side with the most object side lens element surface being taken as the first surface. The symbol Di indicates a surface distance on the optical axis Z1 between $i^{th}$ surface and $(i+1)^{th}$ surface. As the basic configuration of each configuration example is identical, a description will be made, hereinafter, based on the configuration example of imaging lens shown in FIG. 1, and the configuration examples shown in FIGS. 2 to 5 will be described, as required. FIG. 6 is a ray diagram of the imaging lens shown in FIG. 5, illustrating each optical path of an axial light beam 2 and a maximum angle of view light beam 3 from a point at infinity.

An imaging lens L according to an embodiment of the present invention may preferably be used in various types of imaging devices and systems that use image sensors such as, for example, CCDs and CMOSs, in particular, relatively small portable terminal devices and systems, including digital still cameras, camera-equipped portable phones, smartphones, tablet terminals, and PDAs. The imaging lens L includes a first lens L1, a second lens L2, a third lens L3, a fourth lens L4, a fifth lens L5, and a sixth lens L6 disposed in order from the object side along the optical axis Z1.

Figure 12:
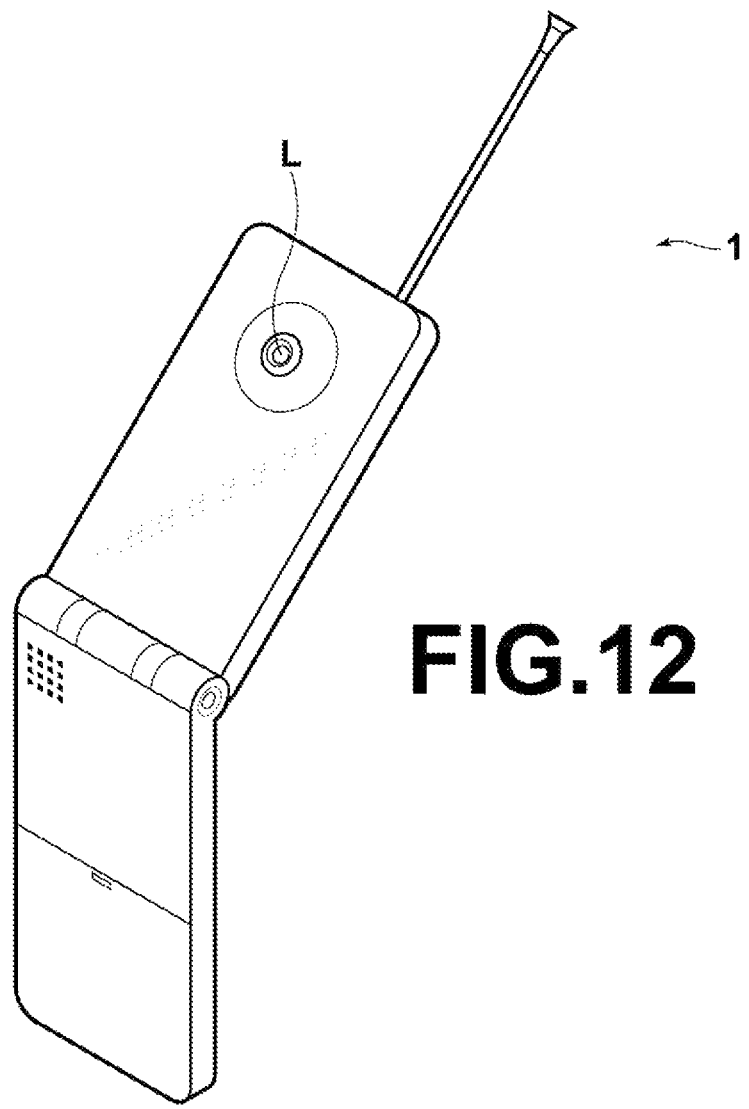
FIG. 12 illustrates an imaging apparatus, which is a portable phone terminal, equipped with the imaging lens of the present invention.

FIG. 12 is a schematic view of a portable phone terminal which is an imaging apparatus 1 according to an embodiment of the present invention. The imaging apparatus 1 includes the imaging lens L according to the present embodiment and an image sensor 100 (FIG. 1), such as a CCD, that outputs an imaging signal according to an optical image formed by the imaging lens L. The image sensor 100 is disposed on the imaging surface of the imaging lens L.

Figure 13:
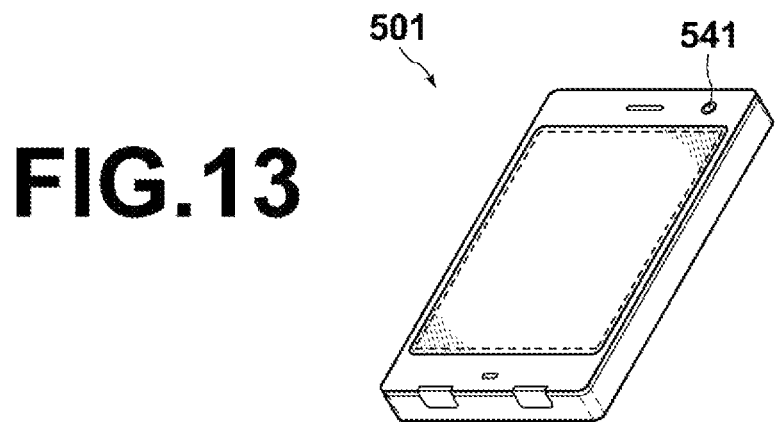
FIG. 13 illustrates an imaging apparatus, which is a smartphone, equipped with the imaging lens of the present invention.

FIG. 13 is a schematic view of a smartphone which is an imaging apparatus 501 according to an embodiment of the present invention. The imaging apparatus 501 according to an embodiment of the present invention includes a camera section 541 which includes the imaging lens L according to the present embodiment and an image sensor 100 (FIG. 1), such as a CCD, that outputs an imaging signal according to an optical image formed by the imaging lens L. The image sensor 100 is disposed on the imaging surface of the imaging lens L.

Various types of optical members CG may be disposed between the sixth lens L6 and the image sensor 100 according to the camera side structure to which the lens is mounted. For example, a plate-like optical member, for example, a cover glass for protecting the imaging surface or an infrared cut filter may be disposed. In this case, for example, a plate-like cover glass with a coating having a filtering effect, such as an infrared cut filter or an ND filter, or with a material having an identical effect may be used as the optical member CG.

Further, an effect comparable to that of the optical member CG may be given by applying a coating on the sixth lens L6, without using the optical member CG. This allows the reduction in the number of parts and overall length.

Preferably, the imaging lens L includes an aperture stop St disposed on the object side of the object side surface of the second lens L2. The disposition of the aperture stop St in such a manner may prevent the incident angles of light rays passing through the optical system with respect to the imaging surface (image sensor) from increasing, in particular, in a peripheral portion of the imaging area. The term "disposed on the object side of the object side surface of the second lens" as used herein refers to that the position of the aperture stop St in an optical axis direction is located at the same position as the intersection point between the axial marginal ray and the object side surface of the second lens L2 or on the object side of the intersection point.

Further, in the case where the aperture stop St is disposed on the object side of the object side surface of the second lens L2 in an optical axis direction, the aperture stop St is preferably disposed on the image side of the surface vertex of the first lens L1. The disposition of the aperture stop St on the image side of the surface vertex of the first lens L1 in this way, allows the overall length of the imaging lens L, including the aperture stop St, to be reduced. In each of the imaging lenses L according to the first to the fifth configuration examples shown in FIGS. 1 to 5 respectively, the aperture stop St is disposed on the object side of the object side surface of the second lens L2 and on the image side of the surface vertex of the first lens L1. The aperture stop St shown in each of FIGS. 1 to 6 does not necessarily represent the size or the shape and indicates the position on the optical axis Z1.

In the imaging lens L, the first lens L1 has a positive refractive power near the optical axis. This is advantageous for reducing the overall lens length. Further, the first lens L1 has a meniscus shape with a convex surface on the object side near the optical axis. This allows the rear side principal point to be located nearer to the object side, and the overall length may be reduced favorably.

The second lens L2 has a negative refractive power near the optical axis. This allows spherical aberration, field curvature, and longitudinal chromatic aberration to be corrected satisfactorily. Preferably, the second lens L2 has a biconcave shape near the optical axis. This allows spherical aberration to be corrected satisfactorily.

Both the third lens L3 and the fourth lens L4 have positive refractive powers near the optical axis. Both the fifth lens L5 and the sixth lens L6 have negative refractive powers near the optical axis. If the first lens L1 to the fourth lens are viewed as one positive lens group, while the fifth lens L5 to sixth lens L6 are viewed as one negative lens group, the imaging lens L may have a telephoto-type configuration and the overall length may be reduced favorably. In that case, disposition of positive powers in a row, as the third lens L3 and the fourth lens L4, allows the refractive power of the entire positive lens group composed of the first lens L1 to the fourth lens L4 to be increased while suppressing the refractive powers of the third lens L3 and the fourth lens L4, whereby spherical aberration, astigmatism, and the like may be corrected satisfactorily, while overall length is reduced.

Preferably, the third lens L3 has a shape with a convex surface on the object side near the optical axis. This allows spherical aberration to be corrected satisfactorily. The third lens L3 may have a positive meniscus shape with a convex surface on the object side or a biconvex shape near the optical axis.

Preferably, the fourth lens L4 has a meniscus shape with a concave shape on the object side near the optical axis. This allows astigmatism to be corrected satisfactorily.

The fifth lens L5 has a biconcave shape near the optical axis. Formation of the fifth lens L5 so as to have a concave shape on the object side surface allows astigmatism to be corrected easily, which is advantageous for increasing the angle of view. Formation of the fifth lens L5 so as to have a concave shape on the image side allows the reduction in overall length to be achieved favorably.

Preferably, the sixth lens L6 has a meniscus shape with a concave shape on the image side near the optical axis. This is advantageous for the reduction in overall length and for the correction of field curvature.

Further, the sixth lens L6 preferably has an aspherical shape having at least one inflection point on the image side surface. This may prevent the incident angles of light rays passing through the optical system with respect to the imaging surface (image sensor) from increasing, in particular, in a peripheral portion of the imaging area. The term "inflection point" on the image side surface of the sixth lens L6 refers to a point where the image side surface shape changes from a convex shape to a concave shape (or from a concave shape to a convex shape) with respect to the image side. The inflection point may be located at any position radially outward from the optical axis if it is within the effective diameter of the image side surface of the sixth lens L6.

According to the imaging lens L, each of lens elements from the first lens L1 to the sixth lens L6 is optimally formed in a six-element configuration. This allows increase in angle of view while reducing the overall lens length, whereby a lens system having high imaging performance which is compatible with higher pixel count of image sensors may be realized.

Preferably, each of the first lens L1 to the sixth lens L6 has an aspherical shape on at least one surface for higher performance of the imaging lens L.

Further, the first lens L1 to the sixth lens L6 are preferably single lenses and not cemented lenses. The use of single lenses for all of the lenses may increase the number of lens surfaces contacting the air in comparison with the case in which a cemented lens is used for any of the lenses and design flexibility is increased, thereby facilitating reduction in overall lens length, increase in angle of view, and increase in resolution.

Still further, if each lens formation of the first lens L1 to the sixth lens L6 of the imaging lens L is set such that the imaging lens has a total angle of view of 70 degrees or more, as in, for example, the imaging lenses according to the first to the fifth embodiment, the imaging lens L may be favorably applied to an image sensor having a size that satisfies the demand of higher resolution of a portable phone and the like, while realizing reduction in overall lens length.

Next, operations and effects of the imaging lens L configured in the manner described above with respect to conditional expressions will be described in further detail. Preferably, the imaging lens L satisfies any one or any combination of the conditional expressions given below. Preferably, a conditional expression to be satisfied by the imaging lens L is selected, as appropriate, according to the requirements of the imaging lens L.

Firstly, the focal length f1 of the first lens L1 and the focal length f of the entire system preferably satisfy a conditional expression (1) given blow.

$$0.7<f/f1<5 \tag{1}$$

The conditional expression (1) defines a preferable numerical range of the ratio of the focal length f of the entire system to the focal length f1 of the first lens L1. Assurance of refractive power for the first lens L1 such that the value of the conditional expression (1) does not fall to or below the lower limit allows the reduction in overall length to be achieved favorably. Containment of the refractive power of the first lens L1 such that the value of the conditional expression (1) does not reach or exceed the upper limit allows spherical aberration and astigmatism at a low angle of view to be corrected satisfactorily. In order to further enhance the effects, a conditional expression (1-1) is preferably satisfied and further preferably a conditional expression (1-2) is satisfied.

$$0.8<f/f1<3 \tag{1-1}$$

$$0.9<f/f1<1.5 \tag{1-2}$$

Preferably, the focal length f3 of the third lens L3 and the focal length f of the entire system satisfy a conditional expression (2) given below.

$$0<f/f3<1.5 \tag{2}$$

The conditional expression (2) defines a preferable numerical range of the ratio of the focal length f of the entire system to the focal length f3 of the third lens L3. Assurance of refractive power for the third lens L3 such that the value of the conditional expression (2) does not fall to or below the lower limit allows the reduction in overall length to be achieved favorably. Containment of the refractive power of the third lens L3 such that the value of the conditional expression (2) does not reach or exceed the upper limit allows spherical aberration to be corrected satisfactorily. In order to further enhance the effects, a conditional expression (2-1) is preferably satisfied and further preferably a conditional expression (2-2) is satisfied.

$$0.3<f/f3<1.2 \tag{2-1}$$

$$0.4<f/f3<1 \tag{2-2}$$

Preferably, the focal length f and a refractive power P34 of the air lens formed by the image side surface of the third lens L3 and the object side surface of the fourth lens L4 satisfy a conditional expression (3) given below.

$$-2.4<f\cdot P34<-1 \tag{3}$$

where, P34 can be obtained by a formula (P) given below, using Nd3 which is a refractive index of the third lens L3 with respect to the d-line, Nd4 which is a refractive index of the fourth lens L4 with respect to the d-line, L3r which is a paraxial radius of curvature of the image side surface of the third lens L3, L4f which is a paraxial radius of curvature of the object side surface of the fourth lens L4, and D7 which is an air space on the optical axis between the third lens L3 and the fourth lens L4.

$$P34 = \frac{1-Nd3}{L3r} + \frac{Nd4-1}{L4f} - \frac{(1-Nd3)\times(Nd4-1)\times D7}{L3r \times L4f} \tag{P}$$

As the refractive power is the inverse of the focal length, if the focal length of the air lens formed by the image side surface of the third lens L3 and the object side surface of the fourth lens L4 is taken as f34a, the conditional expression (3) defines a preferable numerical range of the ratio of the focal length f of the entire system to f34a. Configuration of the lens system such that value of the conditional expression (3) does not fall to or below the lower limit allows distortion to be corrected satisfactorily. Configuration of the lens system such that value of the conditional expression (3) does not reach or exceed the upper limit allows astigmatism to be corrected satisfactorily. In order to further enhance the effects, a conditional expression (3-1) is preferably satisfied.

$$-1.9<f\cdot P34<-1.1 \tag{3-1}$$

Preferably, the paraxial radius of curvature L4f of the object side surface of the fourth lens L4 and the paraxial radius of curvature L4r of the image side surface of the fourth lens L4 satisfy a conditional expression (4) given below.

$$-5.3<(L4r+L4f)/(L4r-L4f)<-3 \tag{4}$$

The conditional expression (4) defines a preferable numerical range with respect to the paraxial radius of curvature L4f of the object side surface of the fourth lens L4 and the paraxial radius of curvature L4r of the image side surface of the fourth lens L4. Formation of the fourth lens L4 such that the value of the conditional expression (4) does not fall to or below the lower limit may prevent the absolute value of the paraxial radius of curvature of the image side surface of the fourth lens L4 from being reduced too much and may correct spherical aberration satisfactorily. Formation of the fourth lens L4 such that the value of the conditional expression (4) does not reach or exceed the upper limit may prevent the absolute value of the paraxial radius of curvature of the object side surface of the fourth lens L4 from being increased too much and may correct astigmatism satisfactorily. In order to further enhance the effects, a conditional expression (4-1) is preferably satisfied.

$$-4.6<(L4r+L4f)/(L4r-L4f)<-3.65 \quad (4\text{-}1)$$

Preferably, the paraxial radius of curvature L5f of the object side surface of the fifth lens L5 and the paraxial radius of curvature L5r of the image side surface of the fifth lens L5 satisfy a conditional expression (5) given below.

$$-2.6<(L5r+L5f)/(L5r-L5f)<3.8 \quad (5)$$

The conditional expression (5) defines a preferable numerical range with respect to the paraxial radius of curvature L5f of the object side surface of the fifth lens L5 and the paraxial radius of curvature L5r of the image side surface of the fifth lens L5. Formation of the fifth lens L5 such that the value of the conditional expression (5) does not fall to or below the lower limit may prevent the absolute value of the paraxial radius of curvature of the image side surface of the fifth lens L5 from being reduced too much and may correct spherical aberration satisfactorily. Formation of the fifth lens L5 such that the value of the conditional expression (5) does not reach or exceed the upper limit may prevent the absolute value of the paraxial radius of curvature of the object side surface of the fifth lens L5 from being increased too much and may correct astigmatism satisfactorily. In order to further enhance the effects, a conditional expression (5-1) is preferably satisfied.

$$-1.4<(L5r+L50)/(L5r-L5f)<2.3 \quad (5\text{-}1)$$

Preferably, the focal length f4 of the fourth lens L4 and the focal length f5 of the fifth lens L5 satisfy a conditional expression (6) given below.

$$-0.67<f4/f5<-0.35 \quad (6)$$

The conditional expression defines a preferable numerical range of the ratio of the focal length f4 of the fourth lens L4 to the focal length f5 of the fifth lens L5. Setting of the refractive powers of the fourth lens L4 and the fifth lens L5 in a manner such that the value of the conditional expression (6) does not fall to or below the lower limit allows spherical aberration to be corrected satisfactorily. Setting of the refractive powers of the fourth lens L4 and the fifth lens L5 in a manner such that the value of the conditional expression (6) does not reach or exceed the upper limit allows the reduction in overall length to be achieved favorably.

Preferably, the focal length f of the entire system, the half angle of view (half value of maximum total angle of view when focused on an object at infinity) w, and the paraxial radius of curvature L6r of the image side surface of the sixth lens L6 satisfy a conditional expression (7) given below.

$$0.5<f\cdot\tan \omega/L6r<20 \quad (7)$$

The conditional expression (7) defines a preferable numerical range of the ratio of the paraxial image height (f·tanω) to the paraxial radius of curvature L6r of the image side surface of the sixth lens L6. Configuration of the lens system such that the value of the conditional expression (7) does not fall to or below the lower limit may prevent the absolute value of the paraxial radius of curvature L6r of the image side surface of the sixth lens L6, which is the most image side surface of the imaging lens L, from being increased too much with respect to the paraxial image height (f·tanω) and may correct field curvature satisfactorily, while achieving the reduction in overall lens length. If the sixth lens L6 is formed to have an aspherical surface shape with a concave shape on the image side and has at least one inflection point, as illustrated in the imaging lens L of each embodiment, and to satisfy the lower limit of the conditional expression (7), field curvature may be corrected satisfactorily from the central angle of view to the peripheral angle of view, so that the increase in angle of view may be realized more easily. Configuration of the lens system such that the value of the conditional expression (7) does not reach or exceed the upper limit may prevent the absolute value of the paraxial radius of curvature L6r of the image side surface of the sixth lens L6, which is the most image side surface of the imaging lens L, from being reduced too much with respect to the paraxial image height (f·tanω), and may prevent the incident angles of light rays passing through the optical system with respect to the imaging surface (image sensor) from increasing in the intermediate angle of view. In order to further enhance the effects, a conditional expression (7-1) is preferably satisfied.

$$1<f\cdot\tan \omega/L6r<5 \quad (7\text{-}1)$$

The imaging lenses according to the embodiments of the present invention may realize higher imaging performance by satisfying, as appropriate, preferable conditions described above. The imaging apparatus according to the present embodiment is configured to output an imaging signal according to an optical image formed by the high performance imaging lens of the present embodiment. Therefore, the apparatus may obtain a wide angle and a high resolution image while the apparatus size is reduced.

Next, specific numerical examples of imaging lenses according to the embodiments of the present invention will be described. Hereinafter, a plurality of numerical examples is described collectively.

Tables 1 and 2 to be shown later indicate specific lens data corresponding to the configuration of the imaging lens illustrated in FIG. 1. In particular, Table 1 indicates basic lens data thereof, while Table 2 indicates aspherical surface data. The surface number Si column in the lens data shown in Table 1 indicates $i^{th}$ surface number of the imaging lens according to Example 1 in which a number i (i=1, 2, 3, - - - ) is given to each surface in a serially increasing manner toward the image side with the object side surface of the most object side optical element being taken as the first surface. The radius of curvature Ri column indicates the value (mm) of radius of curvature of $i^{th}$ surface from the object side in relation to the symbol Ri given in FIG. 1. Likewise, the surface distance Di column indicates the surface distance (mm) on the optical axis Z between $i^{th}$ surface Si and $(i+1)^{th}$ surface Si+1. The Ndj column indicates the value of the refractive index of $j^{th}$ optical element from the object side with respect to the d-line (wavelength of 587.6 nm) and the vdj column indicates the value of the Abbe number of $j^{th}$ optical element from the object side with respect to the d-line.

Table 1 also includes the aperture stop St and the optical member CG. In Table 1, the term (St) is indicated in the surface number column of the surface corresponding to the aperture stop St in addition to the surface number, and the term (IMG) is indicated in the surface number column of the surface corresponding to the imaging surface in addition to the surface number. The sign of the radius of curvature is positive if the surface shape is convex on the object side and negative if it is convex on the image side. As various types of data, values of focal length f (mm) of the entire system, back focus Bf (mm), F-number Fno. and total angle of view 2ω(°) are given in the upper margin of each lens data. Note that the back focus Bf indicates an air equivalent value.

In the basic lens data of Table 1, an asterisk mark * is attached to the surface number of an aspherical surface. In the imaging lens according to Example 1, both surfaces of the first lens L1 to the sixth lens L6 all have aspherical shapes. As the radii of curvature of these aspherical surfaces, the basic lens data of Table 1 shows numerical values of radii of curvature near the optical axis (paraxial radii of curvature).

Table 2 shows aspherical surface data of the imaging lens of Example 1. In a numerical value shown as aspherical surface data, the symbol "E" indicates that the subsequent numerical value is an "exponent" to base 10 and the numerical value preceding "E" is multiplied by the numerical value represented by the exponent to base 10. For example, "1.0E-02" represents "1.0×10$^{-2}$".

As for the aspherical surface data, values of each coefficient An and KA in an aspherical surface shape formula represented by Formula (A) given below are indicated. More specifically, Z indicates the length (mm) of a vertical line from a point on the aspheric surface at a height h to a tangential plane of the vertex of the aspherical surface (plane orthogonal to the optical axis).

$$Z = \frac{C \times h^2}{1 + \sqrt{1 - KA \times C^2 \times h^2}} + \sum_n An \times h^n \quad (A)$$

where:
- Z: depth of the aspherical surface (mm)
- h: distance from the optical axis to the lens surface (height) (mm)
- C: paraxial curvature=1/R (R: paraxial radius of curvature)
- An: n$^{th}$ order aspherical surface coefficient (n is an integer not less than 3)
- KA: aspherical surface coefficient As in the imaging lens of Example 1, specific lens data corresponding to the imaging lens configurations illustrated in FIGS. 2 to 5 are given in Tables 3 to 10, as Examples 2 to 5. In the imaging lenses according to Example 1 to 5, both surfaces of the first lens L1 to the sixth lens L6 all have aspherical shapes.

Figure 7:
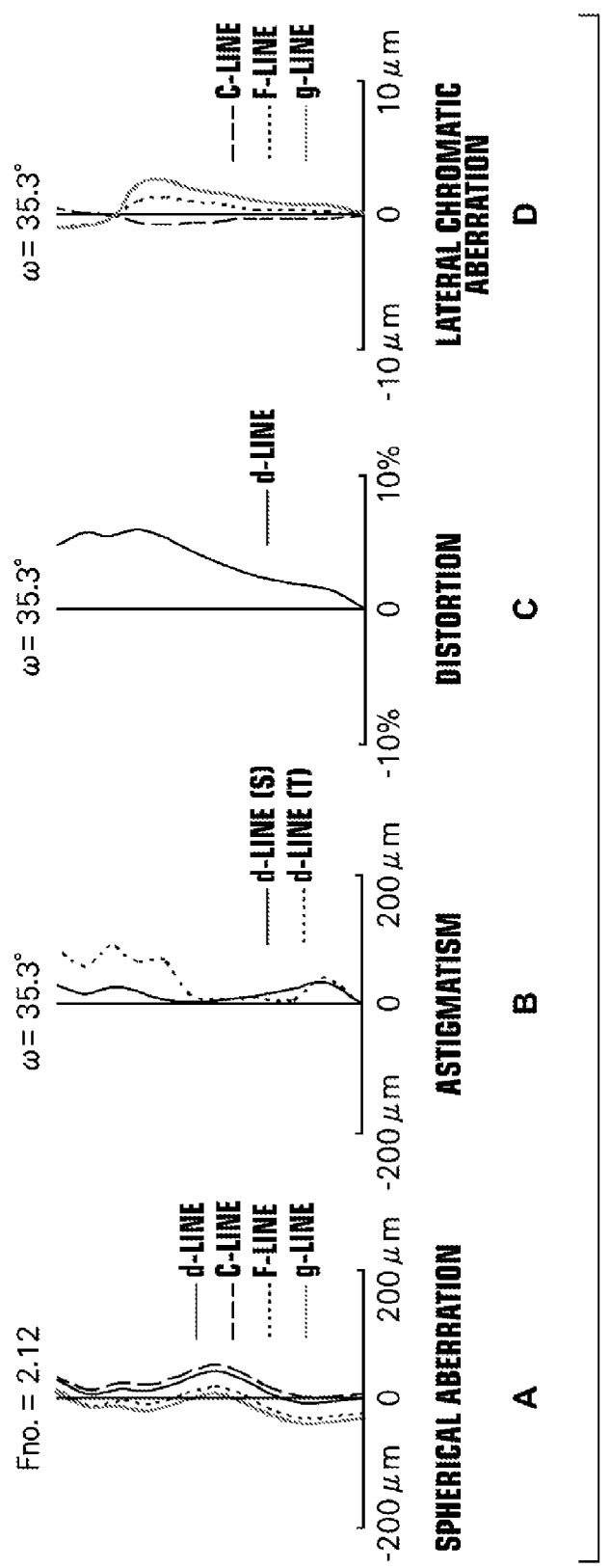
FIG. 7 shows aberration diagrams of the imaging lens according to Example 1, in which A, B, C, and D illustrate spherical aberration, astigmatism, distortion, and lateral chromatic aberration respectively.

A to D of FIG. 7 respectively show aberration diagrams of spherical aberration, astigmatism, distortion, lateral chromatic aberration of the imaging lens of Example 1. Each aberration diagram of spherical aberration, astigmatism, and distortion illustrates aberration with the d-line (wavelength 587.6 nm) as the reference wavelength, but the spherical aberration diagram also illustrates aberrations with respect to the F-line (wavelength 486.1 nm), the C-line (wavelength 656.3 nm), and the g-line (435.8 nm), while the lateral chromatic aberration diagram illustrates aberrations with respect to the F-line, the C-line, and the g-line. In the astigmatism diagram, the solid line illustrates aberration in the sagittal direction (S) and the broken line illustrates aberration in the tangential direction (T). The Fno. and ω represent the F-number and the half angle of view respectively.

Figure 8:
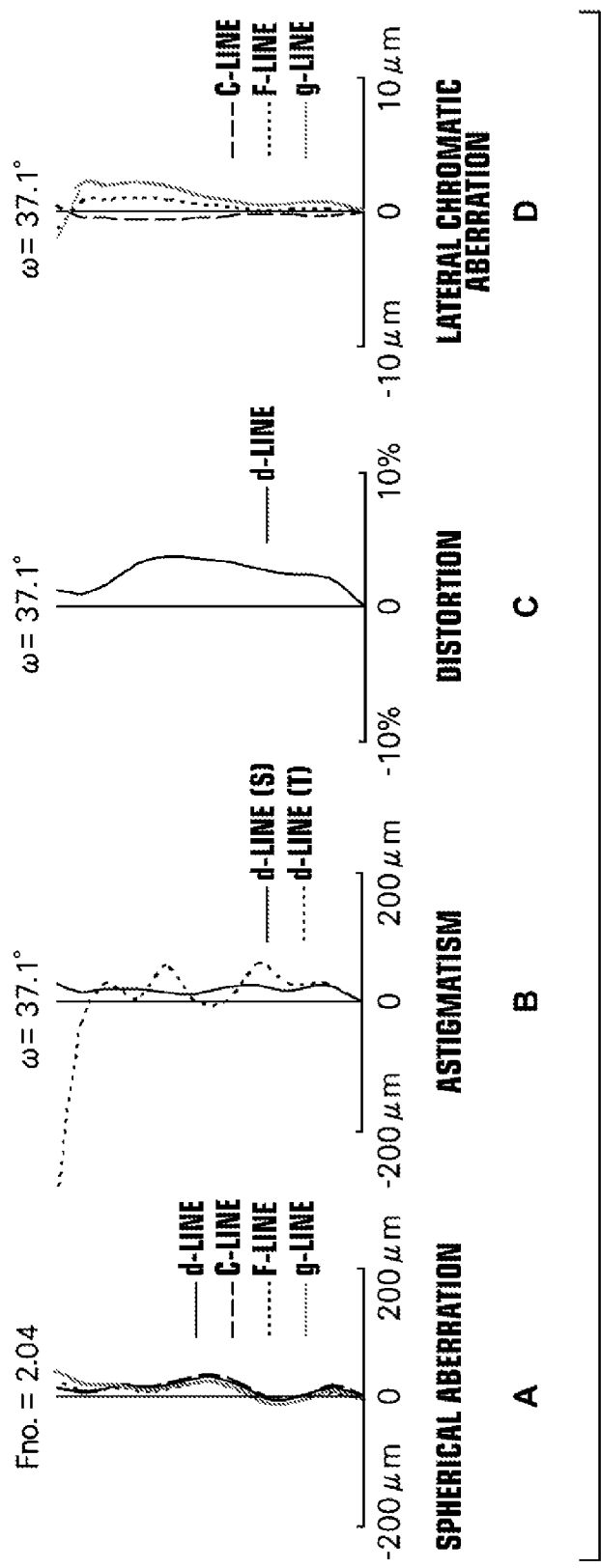
FIG. 8 shows aberration diagrams of the imaging lens according to Example 2, in which A, B, C, and D illustrate spherical aberration, astigmatism, distortion, and lateral chromatic aberration respectively.
Figure 9:
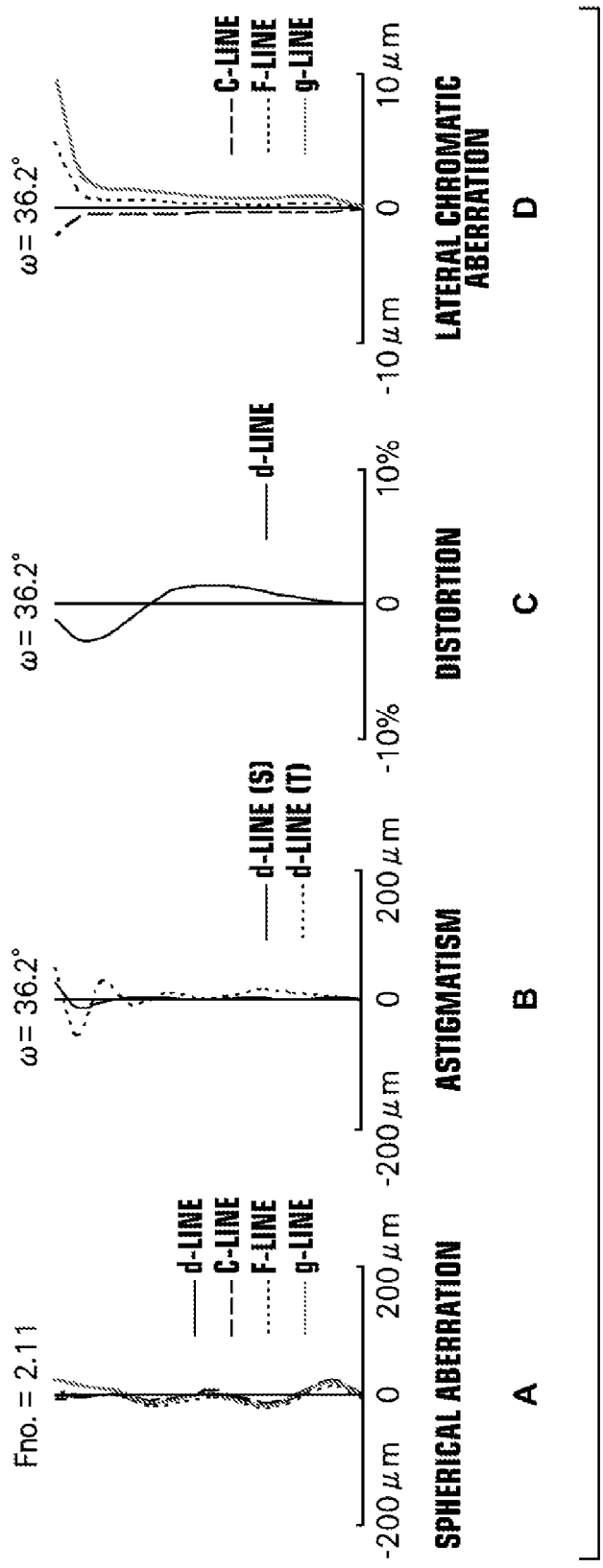
FIG. 9 shows aberration diagrams of the imaging lens according to Example 3, in which A, B, C, and D illustrate spherical aberration, astigmatism, distortion, and lateral chromatic aberration respectively.
Figure 10:
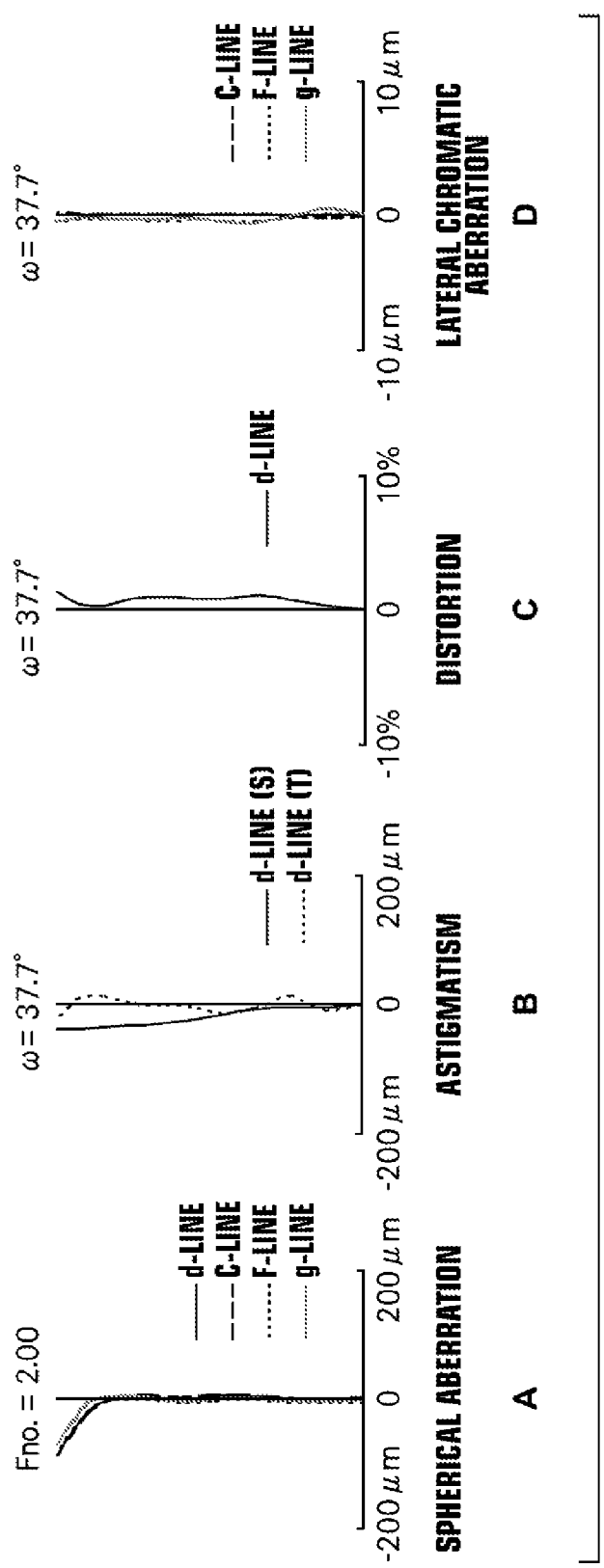
FIG. 10 shows aberration diagrams of the imaging lens according to Example 4, in which A, B, C, and D illustrate spherical aberration, astigmatism, distortion, and lateral chromatic aberration respectively.
Figure 11:
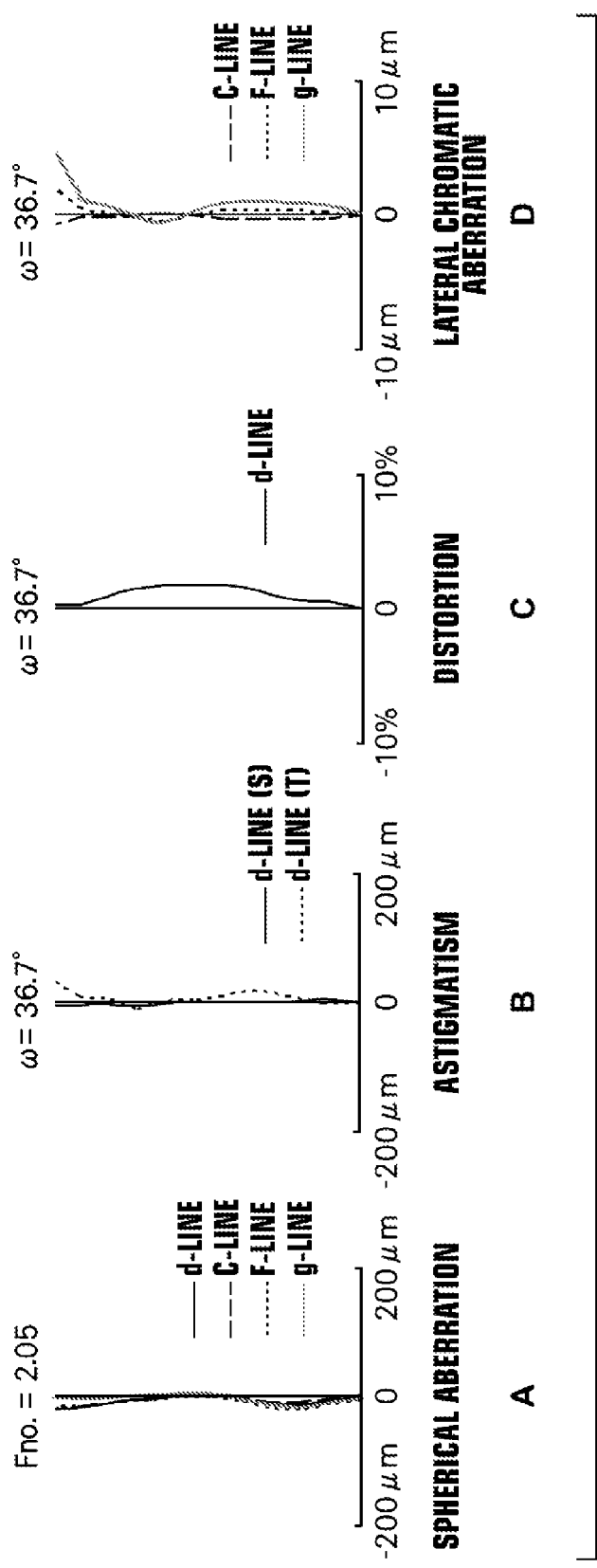
FIG. 11 shows aberration diagrams of the imaging lens according to Example 5, in which A, B, C, and D illustrate spherical aberration, astigmatism, distortion, and lateral chromatic aberration respectively.

Likewise, various types of aberrations of the imaging lenses of Examples 2 to 5 are illustrated in A to D of FIG. 8 to A to D of FIG. 11. The aberration diagrams shown in A to D of FIG. 7 to A to D of FIG. 11 are all in the case in which the object distance is infinity.

Table 11 summarizes values corresponding to the respective conditional expressions (1) to (7) described above for each of Examples 1 to 5.

Each Table indicates values rounded to a predetermined digit. As for the unit of each numerical value, "°" is used for angle, and "mm" is used for length. But, these are only examples and other appropriate units may also be used, as optical systems can be used by proportionally enlarged or reduced.

As is known from each numerical data and each aberration diagram, the imaging lenses of Example 1 to 5 are increased in angle of view, having total angle of views of 70° or more, and realize high imaging performance from the central angle of view to the peripheral angle of view with various types of aberrations being corrected satisfactorily, while the overall length is reduced.

So far, the present invention has been described by way of embodiments and Examples, but it should be understood that the imaging lens of the present invention is not limited to the embodiments and Examples described above, and various changes and modifications may be made. For example, values of radius of curvature, surface distance, refractive index, Abbe number, and aspherical surface coefficient of each lens are not limited to those shown in each numerical example and may take other values.

Each of all Examples is described on the assumption that the imaging lens is used in fixed focus, but it is possible to take a configuration that allows focus adjustment. For example, it is possible to take a configuration that allows auto-focusing by, for example, paying out the entire lens system or moving some of the lenses on the optical axis.

TABLE 1

Example 1
f = 4.150, Bf = 0.799, Fno. = 2.12, 2ω = 70.6

| Si | Ri | Di | Ndj | vdj |
|---|---|---|---|---|
| *1 | 1.65493 | 0.901 | 1.54400 | 55.90 |
| *2 | 5.92665 | 0.050 | | |
| 3(St) | ∞ | 0.303 | | |
| *4 | −4.27025 | 0.199 | 1.65000 | 21.40 |
| *5 | 47.97829 | 0.220 | | |
| *6 | 2.58564 | 0.503 | 1.44800 | 36.80 |
| *7 | 27.13666 | 0.400 | | |
| *8 | −1.77387 | 0.414 | 1.54400 | 55.90 |
| *9 | −1.01744 | 0.210 | | |
| *10 | −10.36318 | 0.252 | 1.58300 | 30.20 |
| *11 | 6.25861 | 0.317 | | |
| *12 | 9.25710 | 0.287 | 1.53000 | 55.80 |
| *13 | 1.71088 | 0.377 | | |
| 14 | ∞ | 0.210 | 1.51700 | 64.20 |
| 15 | ∞ | 0.284 | | |
| 16(IMG) | ∞ | | | |

TABLE 2

Example 1

| | Si | | | | | |
|---|---|---|---|---|---|---|
| | 1 | 2 | 4 | 5 | 6 | 7 |
| KA | 2.1005125E+00 | 2.8596155E+01 | −2.4850141E+00 | 1.7173730E+03 | 4.9193371E+00 | 4.9179661E+02 |
| A4 | −1.4457883E−02 | −3.1710217E−02 | −7.6852945E−02 | −1.1451639E−01 | −2.5528411E−01 | −1.4039585E−01 |
| A6 | −1.5675127E−01 | 6.2459280E−03 | 5.1015037E−01 | 6.3048584E−01 | 2.6695775E−01 | 1.4476476E−02 |
| A8 | 4.5444581E−01 | −2.0313537E−01 | −1.3327797E+00 | −1.2266711E+00 | −3.7251433E−01 | 2.9338203E−02 |

TABLE 2-continued

Example 1

| | | | | | | |
|---|---|---|---|---|---|---|
| A10 | −7.6686592E−01 | 6.0732115E−01 | 2.2901374E+00 | 1.7565323E+00 | 2.2772991E−01 | −2.5147561E−01 |
| A12 | 6.1167872E−01 | −7.9051076E−01 | −2.3849062E+00 | −1.5945831E+00 | 1.5447743E−02 | 3.3323677E−01 |
| A14 | −2.0195017E−01 | 3.4997562E−01 | 1.0327281E+00 | 6.2880260E−01 | −8.6122097E−02 | −1.3970976E−01 |

| | Si | | | | | |
|---|---|---|---|---|---|---|
| | 8 | 9 | 10 | 11 | 12 | 13 |
| KA | −8.4245374E+00 | −1.7791658E−01 | 1.0354164E+01 | 1.3303572E+01 | 2.7112522E+01 | −2.7713555E+00 |
| A3 | 0.0000000E+00 | 0.0000000E+00 | 0.0000000E+00 | 0.0000000E+00 | 0.0000000E+00 | 0.0000000E+00 |
| A4 | 1.4318474E+00 | 1.1052811E+00 | −3.7954098E+00 | −5.2055722E+00 | −5.0555562E+00 | −2.8062751E+00 |
| A5 | −1.1123592E+01 | −4.1193112E+00 | 2.2273072E+01 | 2.6880024E+01 | 2.2129967E+01 | 1.0380525E+01 |
| A6 | 3.3951519E+01 | 1.0210418E+00 | −7.5300421E+01 | −8.2105345E+01 | −5.5325891E+01 | −1.9303326E+01 |
| A7 | −5.4163500E+01 | 3.1594538E+01 | 1.7033988E+02 | 1.6801782E+02 | 9.5130731E+01 | 2.2352511E+01 |
| A8 | 4.3934287E+01 | −9.2232472E+01 | −2.5547610E+02 | −2.2799815E+02 | −1.1267637E−02 | −1.7127059E+01 |
| A9 | −9.2926471E+00 | 1.2342388E+02 | 2.4435065E+02 | 1.9856461E+02 | 8.8317773E+01 | 8.7113159E+00 |
| A10 | −1.2293386E+01 | −8.8905223E+01 | −1.4179696E+02 | −1.0584012E+02 | −4.3259723E+01 | −2.8288472E+00 |
| A11 | 9.7026221E+00 | 3.3394671E+01 | 4.5350873E+01 | 3.1340888E+01 | 1.1927266E+01 | 5.3009158E−01 |
| A12 | −2.1993811E+00 | −5.1513639E+00 | −6.1282101E+00 | −3.9449594E+00 | −1.4090680E+00 | −4.3515130E−02 |

TABLE 3

Example 2
f = 4.022, Bf = 0.838, Fno. = 2.04, 2ω = 74.2

| Si | Ri | Di | Ndj | vdj |
|---|---|---|---|---|
| *1 | 1.68417 | 0.899 | 1.54400 | 55.90 |
| *2 | 5.18071 | 0.050 | | |
| 3(St) | ∞ | 0.223 | | |
| *4 | −3.67989 | 0.164 | 1.65000 | 21.40 |
| *5 | 40.61889 | 0.195 | | |
| *6 | 2.30510 | 0.594 | 1.54126 | 51.66 |
| *7 | 45.56730 | 0.482 | | |
| *8 | −1.70609 | 0.411 | 1.54400 | 55.90 |
| *9 | −1.03708 | 0.186 | | |

TABLE 3-continued

Example 2
f = 4.022, Bf = 0.838, Fno. = 2.04, 2ω = 74.2

| Si | Ri | Di | Ndj | vdj |
|---|---|---|---|---|
| *10 | −8.47024 | 0.299 | 1.58300 | 30.20 |
| *11 | 6.51788 | 0.208 | | |
| *12 | 7.51066 | 0.386 | 1.53000 | 55.80 |
| *13 | 1.96702 | 0.416 | | |
| 14 | ∞ | 0.210 | 1.51700 | 64.20 |
| 15 | ∞ | 0.284 | | |
| 16(IMG) | ∞ | | | |

TABLE 4

Example 2

| | Si | | | |
|---|---|---|---|---|
| | 1 | 2 | 4 | 5 |
| KA | 2.1662748E+00 | 1.6757200E+01 | −1.9053554E+01 | 3.5578000E+02 |
| A4 | −8.5411430E−03 | −4.2596419E−02 | −8.6108724E−02 | −9.2653395E−02 |
| A6 | −1.7189834E−01 | 8.7156265E−03 | 5.1243774E−01 | 6.3637722E−01 |
| A8 | 4.6422647E−01 | −2.1226758E−01 | −1.3298766E+00 | −1.2211988E+00 |
| A10 | −7.5892782E−01 | 6.1042416E−01 | 2.3006721E+00 | 1.7463512E+00 |
| A12 | 5.9658338E−01 | −7.7778307E−01 | −2.3754481E+00 | −1.6080309E+00 |
| A14 | −1.9558192E−01 | 3.3026735E−01 | 9.7273390E−01 | 6.1629275E−01 |

| | Si | | | |
|---|---|---|---|---|
| | 6 | 7 | 8 | 9 |
| KA | 4.5890193E+00 | 1.4219279E+03 | −6.5267559E+00 | −1.4851723E−01 |
| A3 | 0.0000000E+00 | 0.0000000E+00 | 0.0000000E+00 | 0.0000000E+00 |
| A4 | −1.8801415E+00 | −1.2593846E+00 | 6.7413815E−01 | −1.1953194E+00 |
| A5 | 1.8712615E+01 | 1.0316291E+01 | −3.2030214E+00 | 1.2153457E+01 |
| A6 | −1.0168240E+02 | −4.2263456E+01 | −5.1188000E+00 | −5.5136172E+01 |
| A7 | 3.2899732E+02 | 1.0358013E+02 | 5.7866339E+01 | 1.5069607E+02 |
| A8 | −6.7064614E+02 | −1.5914036E+02 | −1.5462403E+02 | −2.5624460E+02 |
| A9 | 8.7150986E+02 | 1.5693989E+02 | 2.0960033E+02 | 2.6936969E+02 |
| A10 | −7.0175701E+02 | −9.6832808E+01 | −1.5780203E+02 | −1.6939258E+02 |
| A11 | 3.1956690E+02 | 3.4329265E+01 | 6.2985543E+01 | 5.8314086E+01 |
| A12 | −6.3025651E+01 | −5.4059723E+00 | −1.0446186E+01 | −8.4546889E+00 |

TABLE 4-continued

Example 2

| | Si | | | |
|---|---|---|---|---|
| | 10 | 11 | 12 | 13 |
| KA | 1.0824805E+01 | 1.2990743E+01 | 1.8267238E+01 | −2.1440451E+00 |
| A3 | 0.0000000E+00 | 0.0000000E+00 | 0.0000000E+00 | 0.0000000E+00 |
| A4 | −6.1379076E+00 | −6.8227707E+00 | −4.7196714E+00 | −7.9742665E−01 |
| A5 | 3.6548801E+01 | 3.3792454E+01 | 1.9765792E+01 | 2.5383860E+00 |
| A6 | −1.1257530E+02 | −9.4389690E+01 | −4.7151741E+01 | −5.4069562E+00 |
| A7 | 2.2380769E+02 | 1.7692871E+02 | 7.6268701E+01 | 7.9378298E+00 |
| A8 | −2.9888497E+02 | −2.2490948E+02 | −8.4580556E+01 | −7.6193351E+00 |
| A9 | 2.6253789E+02 | 1.8782183E+02 | 6.2386337E+01 | 4.6373243E+00 |
| A10 | −1.4416800E+02 | −9.7784954E+01 | −2.9020572E+01 | −1.7213884E+00 |
| A11 | 4.4681548E+01 | 2.8671804E+01 | 7.6771172E+00 | 3.5550283E−01 |
| A12 | −5.9550003E+00 | −3.6093069E+00 | −8.7933635E−01 | −3.1323911E−02 |

TABLE 5

Example 3
f = 4.259, Bf = 0.858, Fno. = 2.11, 2ω = 72.4

| Si | Ri | Di | Ndj | νdj |
|---|---|---|---|---|
| *1 | 1.68845 | 0.917 | 1.54400 | 55.90 |
| *2 | 6.04203 | 0.050 | | |
| 3(St) | ∞ | 0.232 | | |
| *4 | −3.62635 | 0.185 | 1.65000 | 21.40 |
| *5 | 26.55674 | 0.220 | | |
| *6 | 2.35014 | 0.627 | 1.53376 | 54.34 |
| *7 | 46.70022 | 0.485 | | |
| *8 | −1.70420 | 0.387 | 1.54400 | 55.90 |
| *9 | −1.04475 | 0.183 | | |
| *10 | −8.45389 | 0.284 | 1.58300 | 30.20 |
| *11 | 6.50661 | 0.230 | | |
| *12 | 7.26848 | 0.349 | 1.53000 | 55.80 |
| *13 | 1.69517 | 0.432 | | |
| 14 | ∞ | 0.210 | 1.51700 | 64.20 |
| 15 | ∞ | 0.288 | | |
| 16(IMG) | ∞ | | | |

TABLE 6

Example 3

| | Si | | | |
|---|---|---|---|---|
| | 1 | 2 | 4 | 5 |
| KA | 2.1576065E+00 | 1.8021537E+01 | −1.5692154E+01 | −3.5757892E+02 |
| A4 | −9.4726913E−03 | −4.5593524E−02 | −9.1186451E−02 | −9.2690451E−02 |
| A6 | −1.7033915E−01 | 2.4444723E−02 | 5.2515917E−01 | 6.3370861E−01 |
| A8 | 4.5862045E−01 | −2.1883492E−01 | −1.3324227E+00 | −1.2252231E+00 |
| A10 | −7.4648369E−01 | 6.1461683E−01 | 2.2975134E+00 | 1.7530714E+00 |
| A12 | 5.8211036E−01 | −7.6949833E−01 | −2.3711206E+00 | −1.6030223E+00 |
| A14 | −1.8867063E−01 | 3.2472588E−01 | 9.7277670E−01 | 6.0348640E−01 |

| | Si | | | |
|---|---|---|---|---|
| | 6 | 7 | 8 | 9 |
| KA | 4.6089636E+00 | −5.9422750E+03 | −6.6137253E+00 | −1.4544947E−01 |
| A3 | 0.0000000E+00 | 0.0000000E+00 | 0.0000000E+00 | 0.0000000E+00 |
| A4 | −1.8767395E+00 | −1.0755614E+00 | 7.6335063E−01 | 2.1375249E+00 |
| A5 | 1.8710072E+01 | 7.9614984E+00 | −3.6276339E+00 | −1.0437071E+01 |
| A6 | −1.0168413E+02 | −2.9765120E+01 | 1.4174383E−02 | 2.1534395E+01 |
| A7 | 3.2899659E−02 | 6.5442463E+01 | 3.2358434E+01 | −1.0269626E+01 |
| A8 | −6.7064631E+02 | −9.1336218E+01 | −9.1560416E+01 | −3.4977700E+01 |
| A9 | 8.7150999E+02 | 8.2332607E+01 | 1.2265743E+02 | 7.0467628E+01 |
| A10 | −7.0175660E+02 | −4.6999604E+01 | −8.9859383E+01 | −5.7347975E+01 |
| A11 | 3.1956788E+02 | 1.5782825E+01 | 3.4821142E+01 | 2.2598225E+01 |
| A12 | −6.3023896E+01 | −2.4455563E+00 | −5.6251892E+00 | −3.5552962E+00 |

| | Si | | | |
|---|---|---|---|---|
| | 10 | 11 | 12 | 13 |
| KA | 1.1227490E+01 | 1.2841427E+01 | 1.8265557E+01 | −1.8699303E+00 |
| A3 | 0.0000000E+00 | 0.0000000E+00 | 0.0000000E+00 | 0.0000000E+00 |
| A4 | 2.5666259E−01 | −3.4020023E+00 | −3.9943904E+00 | −1.8170053E+00 |
| A5 | −3.8656531E+00 | 1.4969025E+01 | 1.5432953E+01 | 6.1043508E+00 |
| A6 | 9.6891218E+00 | −4.3505442E+01 | −3.5423832E+01 | −1.1227118E+01 |

TABLE 6-continued

Example 3

| | | | | |
|---|---|---|---|---|
| A7 | 3.5618235E−01 | 9.0396892E+01 | 5.5769039E+01 | 1.3211363E+01 |
| A8 | −3.4065424E+01 | −1.2631615E+02 | −6.0261008E+01 | −1.0243706E+01 |
| A9 | 5.6958112E+01 | 1.1286367E+02 | 4.3339440E+01 | 5.1875053E+00 |
| A10 | −4.3243461E+01 | −6.1565850E+01 | −1.9705068E+01 | −1.6489182E+00 |
| A11 | 1.6298896E+01 | 1.8690721E+01 | 5.1159434E+00 | 2.9843592E−01 |
| A12 | −2.4779834E+00 | −2.4222900E+00 | −5.7833314E−01 | −2.3451349E−02 |

TABLE 7

Example 4
f = 3.934, Bf = 1.070, Fno. = 2.00, 2ω = 75.4

| Si | Ri | Di | Ndj | νdj |
|---|---|---|---|---|
| 1(St) | ∞ | −0.350 | | |
| *2 | 1.53961 | 0.618 | 1.54400 | 55.90 |
| *3 | 5.72610 | 0.289 | | |
| *4 | −3.61289 | 0.172 | 1.64000 | 23.30 |
| *5 | 30.83518 | 0.219 | | |
| *6 | 3.03456 | 0.358 | 1.54400 | 55.90 |
| *7 | −112.78070 | 0.506 | | |
| *8 | −1.77654 | 0.446 | 1.54400 | 55.90 |
| *9 | −1.06267 | 0.151 | | |
| *10 | −6.77657 | 0.407 | 1.64000 | 23.30 |
| *11 | 100.00850 | 0.188 | | |
| *12 | 1.93162 | 0.264 | 1.53500 | 56.30 |
| *13 | 0.98317 | 0.632 | | |
| 14 | ∞ | 0.210 | 1.51700 | 64.20 |
| 15 | ∞ | 0.300 | | |
| 16(IMG) | ∞ | | | |

TABLE 8

Example 4

| | Si | | | |
|---|---|---|---|---|
| | 2 | 3 | 4 | 5 |
| KA | 2.0648401E−00 | 1.4110553E+01 | 1.1952669E+01 | −8.0568683E+03 |
| A4 | −3.3066061E−02 | −1.9150823E−02 | −2.1626870E−02 | −6.1055497E−02 |
| A6 | −3.3681132E−02 | 4.3370832E−02 | 3.8625104E−01 | 4.8978986E−01 |
| A8 | 1.9161549E−01 | −2.7542406E−01 | −1.1126710E+00 | −1.0664997E+00 |
| A10 | −6.1463725E−01 | 6.6653093E−01 | 2.1099102E+00 | 1.6924046E+00 |
| A12 | 7.5479062E−01 | −8.1970930E−01 | −2.4476923E+00 | −1.7006362E+00 |
| A14 | −3.6379134E−01 | 3.0067532E−01 | 1.0867977E+00 | 7.2035350E−01 |

| | Si | | | |
|---|---|---|---|---|
| | 6 | 7 | 8 | 9 |
| KA | −1.1673491E+00 | 1.7272759E+03 | 1.1386859E−01 | 8.3782089E−02 |
| A4 | −1.7089510E−01 | −9.8041396E−02 | −8.0640943E−02 | 5.6076309E−02 |
| A6 | 2.6518923E−01 | 1.3387558E−02 | −1.1151182E−01 | −1.9786508E−01 |
| A8 | −4.6627576E−01 | 2.5054571E−03 | −1.1495761E−03 | 1.2893174E−01 |
| A10 | 6.3132515E−01 | 7.6436418E−03 | 2.6768609E−01 | 2.9918226E−02 |
| A12 | −4.8655047E−01 | 4.9538170E−03 | −1.7256856E−01 | −2.0962419E−02 |
| A14 | 1.5027805E−01 | 0.0000000E+00 | 2.9955221E−02 | −2.0011974E−04 |

| | Si | | | |
|---|---|---|---|---|
| | 10 | 11 | 12 | 13 |
| KA | 7.3474708E+00 | −1.9449849E+03 | −4.0198315E+00 | −3.6228740E+00 |
| A3 | 0.0000000E+00 | 0.0000000E+00 | 0.0000000E+00 | 0.0000000E+00 |
| A4 | 1.0284777E−01 | −1.2270490E+00 | −3.3646851E+00 | −1.6858923E+00 |
| A5 | −3.3198393E−01 | 5.0891096E+00 | 1.1893742E+01 | 4.8565114E+00 |
| A6 | −2.4588234E+00 | −1.5375684E+01 | −2.9290900E+01 | −7.9166235E+00 |
| A7 | 1.3125553E+01 | 3.1881623E+01 | 5.0967196E+01 | 8.6064022E+00 |
| A8 | −2.7442056E+01 | −4.1890255E+01 | −5.7896518E+01 | −6.3147595E+00 |
| A9 | 3.0733319E+01 | 3.3944837E+01 | 4.1475347E+01 | 3.0535487E+00 |
| A10 | −1.9416892E+01 | −1.6437390E+01 | −1.8046294E+01 | −9.2773364E−01 |
| A11 | 6.5379875E+00 | 4.3628801E+00 | 4.3551386E+00 | 1.5999830E−01 |
| A12 | −9.1386556E−01 | −4.8835349E−01 | −4.4707227E−01 | −1.1911451E−02 |

TABLE 9

Example 5
f = 4.126 Bf = 1.032, Fno. = 2.05, 2ω = 73.4

| Si | Ri | Di | Ndj | νdj |
|---|---|---|---|---|
| 1(St) | ∞ | −0.350 | | |
| *2 | 1.54477 | 0.643 | 1.54400 | 55.90 |
| *3 | 7.78451 | 0.199 | | |
| *4 | −60.22220 | 0.207 | 1.64000 | 23.30 |
| *5 | 3.68532 | 0.311 | | |
| *6 | 3.96121 | 0.516 | 1.54400 | 55.90 |
| *7 | 49.41029 | 0.434 | | |
| *8 | −1.99473 | 0.347 | 1.54400 | 55.90 |
| *9 | −1.21969 | 0.206 | | |
| *10 | −5.89726 | 0.443 | 1.64000 | 23.30 |
| *11 | 100.40489 | 0.157 | | |
| *12 | 1.53351 | 0.263 | 1.53500 | 56.30 |
| *13 | 0.94119 | 0.632 | | |
| 14 | ∞ | 0.210 | 1.51700 | 64.20 |
| 15 | ∞ | 0.262 | | |
| 16(IMG) | ∞ | | | |

TABLE 10

Example 5

| | Si | | | |
|---|---|---|---|---|
| | 2 | 3 | 4 | 5 |
| KA | 1.2481871E+00 | −8.8999485E+01 | −1.0747609E+05 | 1.0000000E+00 |
| A4 | 2.4908812E−03 | −7.4502631E−02 | −2.7328174E−01 | −1.9065496E−01 |
| A6 | −9.9916356E−02 | 1.5494162E−01 | 9.2664250E−01 | 6.9855942E−01 |
| A8 | 2.5246838E−01 | −2.9061309E−01 | −1.6230977E+00 | −8.1146297E−01 |
| A10 | −3.7628419E−01 | 3.7432741E−01 | 1.9744466E+00 | 7.1220815E−01 |
| A12 | 2.7966812E−01 | −2.8757777E−01 | −1.4858390E+00 | −4.9832031E−01 |
| A14 | −9.0221761E−02 | 8.2232128E−02 | 4.8636638E−01 | 1.9770562E−01 |

| | Si | | | |
|---|---|---|---|---|
| | 6 | 7 | 8 | 9 |
| KA | −1.8741261E+00 | 1.0000000E+00 | −2.3131142E−02 | 3.1604165E−01 |
| A4 | −1.8967466E−01 | −1.2524909E−01 | −3.3844839E−02 | 9.8940786E−02 |
| A6 | 2.5729488E−01 | −1.1763138E−02 | −1.1596150E−01 | −1.6260113E−01 |
| A8 | −4.9650611E−01 | 4.8023947E−03 | −6.3049479E−03 | 1.0898603E−01 |
| A10 | 6.8375357E−01 | 5.4052408E−03 | 2.3720306E−01 | 2.4814881E−02 |
| A12 | −5.4235403E−01 | −7.8572102E−03 | −1.6103956E−01 | −1.9546337E−02 |
| A14 | 1.6527449E−01 | 0.0000000E+00 | 3.0836065E−02 | 3.1474758E−05 |

| | Si | | | |
|---|---|---|---|---|
| | 10 | 11 | 12 | 13 |
| KA | 1.6780227E+01 | 1.0000000E+00 | −1.9043100E+00 | −3.2510700E+00 |
| A3 | 0.0000000E+00 | 0.0000000E+00 | 0.0000000E+00 | 0.0000000E+00 |
| A4 | 1.7256663E−01 | −7.5264498E−01 | −3.0086086E+00 | −1.5166048E+00 |
| A5 | −9.1005805E−02 | 2.6034149E+00 | 1.0093402E+01 | 4.1924144E+00 |
| A6 | −3.1111447E+00 | −5.5215954E+00 | −2.0742635E+01 | −5.9015266E+00 |
| A7 | 1.1980515E+01 | 7.4618875E+00 | 2.7442024E+01 | 4.6608391E+00 |
| A8 | −2.0891028E+01 | −6.1755293E+00 | −2.0555639E+01 | −1.7851387E+00 |
| A9 | 1.7808064E+01 | 2.9452798E+00 | 3.9058319E+00 | −5.8880972E−02 |
| A10 | −3.6394634E+00 | −1.2111672E+00 | 6.6112690E+00 | 3.3972419E−01 |
| A11 | −4.8560160E+00 | 1.0570620E+00 | −5.1892614E+00 | −1.0577007E−01 |
| A12 | 7.7503662E−01 | −6.1087705E−01 | 4.5585152E−01 | −5.5183755E−03 |
| A13 | 4.8370960E+00 | −4.9868201E−02 | 1.1116007E+00 | 7.0235462E−03 |
| A14 | −4.3794117E+00 | 2.1088759E−01 | −6.0638701E−01 | 2.9748867E−04 |
| A15 | 1.5664405E+00 | −8.6390919E−02 | 1.3319867E−01 | −5.6219452E−04 |
| A16 | −2.1061438E−01 | 1.1632466E−02 | −1.1358565E−02 | 7.2780601E−05 |

TABLE 11

Values of Conditional Expressions

| Expression No. | Conditional Expression | Example 1 | Example 2 | Example 3 | Example 4 | Example 5 |
|---|---|---|---|---|---|---|
| (1) | f/f1 | 1.1 | 1.0 | 1.1 | 1.1 | 1.2 |
| (2) | f/f3 | 0.7 | 0.9 | 0.9 | 0.7 | 0.5 |
| (3) | f · P34 | −1.3 | −1.3 | −1.4 | −1.2 | −1.2 |
| (4) | (L4r + L4f)/(L4r − L4f) | −3.69 | −4.10 | −4.17 | −3.98 | −4.15 |
| (5) | (L5r + L5f)/(L5r − L5f) | −0.2 | −0.1 | −0.1 | 0.9 | 0.9 |

TABLE 11-continued

Values of Conditional Expressions

| Expression No. | Conditional Expression | Example 1 | Example 2 | Example 3 | Example 4 | Example 5 |
|---|---|---|---|---|---|---|
| (6) | f4/f5 | −0.55 | −0.64 | −0.66 | −0.40 | −0.57 |
| (7) | f · tanω/L6r | 1.7 | 1.5 | 1.8 | 3.1 | 3.1 |

The paraxial radius of curvature, surface distance, refractive index, and Abbe number described above were obtained by an optical measurement expert through measurements in the manners described below.

The paraxial radius of curvature was obtained in the following steps by measuring the lens using an ultra-accuracy 3-D profilometer, UA3P (product of Panasonic Factory Solutions Corporation). A paraxial radius of curvature $R_m$ (m is a natural number) and a cone constant $K_m$ are tentatively set and inputted to the UA3P and an $n^{th}$ order aspherical surface coefficient An of the aspherical surface shape formula is calculated from these and measurement data using an auxiliary fitting function of the UA3P. It is assumed, in the aspherical surface shape formula (A), that $C=1/R_m$ and $KA=K_m-1$. From $R_m$, $K_m$, An, and the aspherical surface shape formula, a depth Z of the aspherical surface in an optical axis direction according to the height h from the optical axis is calculated. A difference between a calculated depth Z and a measured depth Z' is obtained at each height h from the optical axis, then a determination is made whether or not the difference is within a predetermined range, and if the difference is within the predetermined range, the set $R_m$ is taken as the paraxial radius of curvature. On the other hand, if the difference is outside of the predetermined range, at least one of the values of $R_m$ and $K_m$ used in the calculation of the difference is set to $R_{m+1}$ and $K_{m+1}$ and inputted to the UA3P, then processing identical to that described above is performed, and determination processing whether or not a difference between a calculated depth Z and a measured depth Z' at each height h from the optical axis is within the predetermined range is repeated until the difference between the calculated depth Z and the measured depth Z' at each height h from the optical axis falls within the predetermined range. The term, within a predetermined range, as used herein refers to within 200 nm. The range of h is a range corresponding to 0 to ⅕ of the maximum outer diameter.

The surface distance was obtained by performing measurement using a thickness and distance measuring device for coupling lenses, OptiSurf (product of Trioptics).

The refractive index was obtained by measuring a test object with the temperature of the test object being maintained at 25° C.

using a precision refractometer, KPR-2000 (product of Shimadzu Corporation). The refractive index measured at the d-line (wavelength 587.6 nm) is taken as Nd. Likewise, the refractive indices measured at the e-line (wavelength 546.1 nm), the F-line (wavelength 486.1 nm), the C-line (wavelength 656.3 nm) and the g-line (wavelength 435.8 nm) are taken as Ne, NF, NC, and Ng respectively. The Abbe number vd with respect to the d-line was obtained by substituting the Nd, NF, and NC obtained by the aforementioned measurements in a formula, vd=(Nd−1)/(NF−NC).

What is claimed is:

1. An imaging lens consisting of six lenses:
   a first lens having a positive refractive power and a meniscus shape with a convex surface on the object side;
   a second lens having a negative refractive power;
   a third lens having a positive refractive power;
   a fourth lens having a positive refractive power;
   a fifth lens having a negative refractive power and a biconcave shape; and
   a sixth lens having a negative refractive power, disposed in order from the object side,
   wherein the imaging lens further satisfies a conditional expression given below:

$$-5.3<(L4r+L4f)/(L4r-L4f)<-3 \tag{4}$$

where:
L4f: paraxial radius of curvature of the object side surface of the fourth lens
L4r: paraxial radius of curvature of the image side surface of the fourth lens.

2. The imaging lens as claimed in claim 1, wherein the fourth lens has a meniscus shape with a concave surface on the object side.

3. The imaging lens as claimed in claim 1, wherein the sixth lens has a meniscus shape with a concave surface on the image side.

4. The imaging lens as claimed in claim 1, wherein the second lens has a biconcave shape.

5. The imaging lens as claimed in claim 1, wherein the third lens has a convex surface on the object side.

6. The imaging lens as claimed in claim 1, wherein the imaging lens further satisfies a conditional expression given below:

$$0.7<f/f1<5 \tag{1}$$

where:
f: focal length of the entire system
f1: focal length of the first lens.

7. The imaging lens as claimed in claim 1, wherein the imaging lens further satisfies a conditional expression given below:

$$0<f/f3<1.5 \tag{2}$$

where:
f: focal length of the entire system
f3: focal length of the third lens.

8. The imaging lens as claimed in claim 1, wherein the imaging lens further satisfies a conditional expression given below:

$$-2.4<f \cdot P34<-1 \tag{3}$$

where:
f: focal length of the entire system
P34: refractive power of air lens formed by the image side surface of the third lens and the object side surface of the fourth lens, and can be obtained by a formula (P) given below:

$$P34 = \frac{1-Nd3}{L3r} + \frac{Nd4-1}{L4f} - \frac{(1-Nd3)\times(Nd4-1)\times D7}{L3r \times L4f} \tag{P}$$

where:
- Nd3: refractive index of the third lens with respect to the d-line
- Nd4: refractive index of the fourth lens with respect to the d-line
- L3r: paraxial radius of curvature of the image side surface of the third lens
- L4f: paraxial radius of curvature of the object side surface of the fourth lens
- D7: air distance on the optical axis between the third lens and the fourth lens.

9. The imaging lens as claimed in claim 1, wherein the imaging lens further satisfies a conditional expression given below:

$$-2.6<(L5r+L5f)/(L5r-L5f)<3.8 \tag{5}$$

where:
- L5f: paraxial radius of curvature of the object side surface of the fifth lens
- L5r: paraxial radius of curvature of the image side surface of the fifth lens.

10. The imaging lens as claimed in claim 1, wherein the imaging lens further satisfies a conditional expression given below:

$$-0.67<f4/f5<-0.35 \tag{6}$$

where:
- f4: focal length of the fourth lens
- f5: focal length of the fifth lens.

11. The imaging lens as claimed in claim 1, wherein the imaging lens further satisfies a conditional expression given below:

$$0.5<f \cdot \tan\omega/L6r<20 \tag{7}$$

where:
- f: focal length of the entire system
- ω: half angle of view
- L6r: paraxial radius of curvature of the image side surface of the sixth lens.

12. The imaging lens as claimed in claim 1, wherein a stop is disposed on the object side of the object side surface of the second lens.

13. The imaging lens as claimed in claim 6, wherein the imaging lens further satisfies a conditional expression given below:

$$0.8<f/f1<3 \tag{1-1}$$

14. An imaging lens consisting of six lenses:
- a first lens having a positive refractive power and a meniscus shape with a convex surface on the object side;
- a second lens having a negative refractive power;
- a third lens having a positive refractive power;
- a fourth lens having a positive refractive power;
- a fifth lens having a negative refractive power and a biconcave shape; and
- a sixth lens having a negative refractive power, disposed in order from the object side, wherein the imaging lens further satisfies a conditional expression given below:

$$0.3<f/f3<1.2 \tag{2-1}$$

where:
- f: focal length of the entire system
- f3: focal length of the third lens.

15. The imaging lens as claimed in claim 8, wherein the imaging lens further satisfies a conditional expression given below:

$$-1.9<f \cdot P34<-1.1 \tag{3-1}$$

16. The imaging lens as claimed in claim 1, wherein the imaging lens further satisfies a conditional expression given below:

$$-4.6<(L4r+L4f)/(L4r-L4f)<-3.65 \tag{4-1}$$

17. The imaging lens as claimed in claim 9, wherein the imaging lens further satisfies a conditional expression given below:

$$-1.4<(L5r+L5f)/(L5r-L5f)<2.3 \tag{5-1}$$

18. The imaging lens as claimed in claim 11, wherein the imaging lens further satisfies a conditional expression given below:

$$1<f \cdot \tan\omega/L6r<5 \tag{7-1}$$

19. An imaging apparatus equipped with the imaging lens as claimed in claim 1 and further comprising an electronic imaging sensor.

20. An imaging apparatus equipped with the imaging lens as claimed in claim 14 and further comprising an electronic imaging sensor.

* * * * *